US012786673B2

(12) United States Patent
Oshima et al.

(10) Patent No.: US 12,786,673 B2
(45) Date of Patent: Nov. 3, 2026

(54) WIRELESS COMMUNICATION SYSTEM, TRANSPORT VEHICLE-SIDE COMMUNICATION DEVICE, AND COMMUNICATION METHOD

(71) Applicant: Murata Machinery, Ltd., Kyoto (JP)

(72) Inventors: Munekuni Oshima, Ise (JP); Tomoya Kimata, Inuyama (JP); Tetsuya Kuwahara, Kyoto (JP); Hiroyoshi Takahara, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 401 days.

(21) Appl. No.: 18/703,888

(22) PCT Filed: Oct. 5, 2022

(86) PCT No.: PCT/JP2022/037285
§ 371 (c)(1),
(2) Date: Apr. 23, 2024

(87) PCT Pub. No.: WO2023/074291
PCT Pub. Date: May 4, 2023

(65) Prior Publication Data

US 2026/0197609 A1 Jul. 9, 2026

(30) Foreign Application Priority Data

Oct. 29, 2021 (JP) ................................ 2021-177548

(51) Int. Cl.
*H04W 4/35* (2018.01)
*H04W 4/70* (2018.01)

(52) U.S. Cl.
CPC .............. *H04W 4/35* (2018.02); *H04W 4/70* (2018.02)

(58) Field of Classification Search
CPC ......... H04W 4/35; H04W 4/70; H04W 74/08; B65G 1/04; H10P 72/00
(Continued)

(56) References Cited

U.S. PATENT DOCUMENTS

2019/0156597 A1* 5/2019 Santoro .................. G07C 5/008
2021/0057254 A1 2/2021 Kitamura et al.
(Continued)

FOREIGN PATENT DOCUMENTS

JP 6712036 B2 * 6/2020
WO 2015/059861 A1 4/2015
(Continued)

OTHER PUBLICATIONS

International Search Report dated Dec. 27, 2022, of counterpart International Application No. PCT/JP2022/037285 along with an English translation.

*Primary Examiner* — Rownak Islam
(74) *Attorney, Agent, or Firm* — DLA Piper LLP (US)

(57) ABSTRACT

A wireless communication system includes a transport vehicle, a transport vehicle-side communication device, and a port-side communication device that performs an interlock communication by wireless communication with the transport vehicle-side communication device in a predetermined cycle. The transport vehicle-side communication device includes a determiner and a processing unit. Before a pairing signal is transmitted, the determiner determines whether another transport vehicle is performing an interlock communication using a channel that is to be used for the wireless communication. When the determiner determines that another transport vehicle is performing an interlock communication, the processing unit performs control to cause the transmission timing of a signal related to an interlock communication to differ from the transmission timing of a
(Continued)

signal related to the interlock communication performed by the other transport vehicle.

12 Claims, 12 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2021/0265184 A1 | 8/2021 | Kitamura et al. | |
| 2023/0206758 A1* | 6/2023 | Scharles .......... | G08G 1/096783<br>701/65 |

FOREIGN PATENT DOCUMENTS

| | | |
|---|---|---|
| WO | 2019/138802 A1 | 7/2019 |
| WO | 2019/244466 A1 | 12/2019 |

* cited by examiner

FIG. 6

62

| Station number of semiconductor processing device | Wireless Ch of port-side communication device | Device number of port-side communication device |
|---|---|---|
| 00001 | 001 | 00001 |
| ... | ... | ... |

WIRELESS COMMUNICATION SYSTEM, TRANSPORT VEHICLE-SIDE COMMUNICATION DEVICE, AND COMMUNICATION METHOD

TECHNICAL FIELD

This disclosure relates to a wireless communication system, a transport vehicle-side communication device, and a communication method.

BACKGROUND

WO 2019/244466 discloses a transport system including a plurality of transport vehicles to transport a plurality of objects, and a plurality of communication devices connected one-to-one to a plurality of ports on which the plurality of objects are to be placed. In the transport system, an interlock communication for transferring an object to a corresponding one of the plurality of ports is performed between each of the plurality of transport vehicles and a corresponding one of the plurality of communication devices connected one-to-one to the plurality of ports.

The following problem may occur in the transport system disclosed in WO 2019/244466. For example, it is assumed that interlock communications between the plurality of transport vehicles and the plurality of communication devices are performed in the same channel. In such an example, when the plurality of communication devices are placed relatively close to one another, a plurality of communication data items transmitted from the plurality of transport vehicles may collide with one another to cause communication error.

It could therefore be helpful to provide a wireless communication system, a transport vehicle-side communication device, and a communication method that can reduce communication error in an interlock communication between a transport vehicle and a port-side communication device.

SUMMARY

We thus provide a wireless communication system that includes: a transport vehicle that travels along a track to transport an object; a transport vehicle-side communication device that is connected to the transport vehicle; and a port-side communication device that is connected to a port to or from which the object is to be transferred by the transport vehicle, and performs, by wireless communication with the transport vehicle-side communication device in a predetermined cycle, an interlock communication for transferring the object between the port and the transport vehicle, when the port-side communication device receives a pairing signal as a trigger from the transport vehicle-side communication device. The transport vehicle-side communication device includes: a determiner that determines, before the pairing signal is transmitted, whether an other transport vehicle is performing an interlock communication using a channel that is to be used for the wireless communication between the transport vehicle-side communication device and the port-side communication device; and a processing unit that performs control to cause a transmission timing of a signal related to the interlock communication to differ from a transmission timing of a signal related to the interlock communication performed by the other transport vehicle, when the determiner determines that the other transport vehicle is performing the interlock communication using the channel.

Accordingly, even when a plurality of transport vehicles performing interlock communications using the same channel are present relatively close to one another, wireless communication interference is unlikely to occur since the transmission timings of signals related to the interlock communications are different from one another. In other words, communication error in an interlock communication between a transport vehicle and a port-side communication device can be reduced.

For example, when the determiner determines that the other transport vehicle is performing the interlock communication using the channel, the processing unit may be configured to perform control to cause a transmission timing of the pairing signal to differ from the transmission timing of the signal related to the interlock communication performed by the other transport vehicle.

Accordingly, even when a plurality of transport vehicles performing interlock communications using the same channel are present relatively close to one another, wireless communication interference is unlikely to occur since the transmission timings of pairing signals are different from one another.

For example, the transport vehicle-side communication device includes a detector that detects a signal strength of wireless communication related to the interlock communication performed by the other transport vehicle, and when the determiner determines that a plurality of other transport vehicles each of which is the other transport vehicle are performing interlock communications using the channel, the processing unit may be configured to determine, among the plurality of other transport vehicles, a preferential target that is a transport vehicle with respect to which the transmission timing of the signal related to the interlock communication is to be caused to differ, based on signal strengths detected by the detector.

Accordingly, since a preferential target is determined based on the signal strengths each of which is an indicator indicating likelihood of wireless communication interference, wireless communication interference can be effectively prevented.

For example, the processing unit may be configured to preferentially determine, as the preferential target, a transport vehicle for which the signal strength having a higher value has been detected by the detector, among the plurality of other transport vehicles.

Accordingly, since a transport vehicle that has a relatively high possibility of causing wireless communication interference is determined as the preferential target among the plurality of other transport vehicles, wireless communication interference can be effectively prevented.

For example, the processing unit may be configured to determine, as the preferential target, a transport vehicle for which the signal strength having a highest value has been detected by the detector, among the plurality of other transport vehicles.

Accordingly, since a transport vehicle that has the highest possibility of causing wireless communication interference is determined as the preferential target among the plurality of other transport vehicles, wireless communication interference can be effectively prevented.

For example, the processing unit may be configured to determine, as the preferential target, a transport vehicle for which the signal strength having a predetermined threshold value or more has been detected by the detector, among the plurality of other transport vehicles.

Accordingly, since a transport vehicle that may cause wireless communication interference is determined as the preferential target among the plurality of other transport vehicles, wireless communication interference can be effectively prevented.

For example, when the determiner determines that a plurality of other transport vehicles each of which is the other transport vehicle are performing interlock communications using the channel, the processing unit may be configured to determine, among the plurality of other transport vehicles, a preferential target that is a transport vehicle with respect to which the transmission timing of the signal related to the interlock communication is to be caused to differ, based on status of progress of each of the interlock communications performed by the plurality of other transport vehicles.

Accordingly, since the preferential target is determined based on the status of progress of each of the interlock communications that is an indicator indicating a length of time during which wireless communication interference may occur, wireless communication interference can be effectively prevented.

For example, the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit may be configured to preferentially determine, as the preferential target, a transport vehicle of which status of progress of the interlock communication is the execution stage of the pre-transfer procedure, among the plurality of other transport vehicles.

Accordingly, since a transport vehicle that takes a relatively long time to complete an interlock communication, that is, a transport vehicle for which a time period during which wireless communication interference may occur is relatively long is determined as the preferential target among the plurality of other transport vehicles, wireless communication interference can be effectively prevented.

For example, the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit may be configured to preferentially determine, as preferential targets, a transport vehicle of which status of progress of the interlock communication is the execution stage of the pre-transfer procedure and a transport vehicle of which status of progress of the interlock communication is the execution stage of the transfer procedure, among the plurality of other transport vehicles, the preferential targets each being the preferential target.

Accordingly, since a transport vehicle that takes a relatively long time to complete an interlock communication, that is, a transport vehicle for which a time period during which wireless communication interference may occur is relatively long is determined as the preferential target among the plurality of other transport vehicles, wireless communication interference can be effectively prevented.

For example, the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit may be configured to exclude, from being determined as the preferential target, a transport vehicle of which status of progress of the interlock communication is the execution stage of the post-transfer procedure, among the plurality of other transport vehicles.

Accordingly, since a transport vehicle that takes a relatively short time to complete an interlock communication, that is, a transport vehicle for which a time period during which wireless communication interference may occur is relatively short is excluded from being determined as the preferential target among the plurality of other transport vehicles, a transport vehicle that has a relatively high possibility of causing wireless communication interference is likely to be determined as the preferential target among the plurality of other transport vehicles, and wireless communication interference can be effectively prevented.

We also provide a transport vehicle-side communication device that is connected to a transport vehicle that travels along a track to transport an object. The transport vehicle-side communication device includes: a determiner that determines whether an other transport vehicle is performing an interlock communication using a channel that is to be used for wireless communication between the transport vehicle-side communication device and a port-side communication device connected to a port to or from which the object is to be transferred by the transport vehicle, before a pairing signal is transmitted as a trigger for causing the port-side communication device to perform, by the wireless communication with the transport vehicle-side communication device in a predetermined cycle, an interlock communication for transferring the object between the port and the transport vehicle; and a processing unit that performs control to cause a transmission timing of a signal related to the interlock communication to differ from a transmission timing of a signal related to the interlock communication performed by the other transport vehicle, when the determiner determines that the other transport vehicle is performing the interlock communication using the channel.

Accordingly, even when a plurality of transport vehicles performing interlock communications using the same channel are present relatively close to one another, wireless communication interference is unlikely to occur since the transmission timings of signals related to the interlock communications are different from one another. In other words, communication error in an interlock communication between a transport vehicle and a port-side communication device can be reduced.

We further provide a communication method of a transport vehicle-side communication device that is connected to a transport vehicle that travels along a track to transport an object. The communication method includes: determining whether an other transport vehicle is performing an interlock communication using a channel that is to be used for wireless communication between the transport vehicle-side communication device and a port-side communication device connected to a port to or from which the object is to be transferred by the transport vehicle, before a pairing signal is transmitted as a trigger for causing the port-side communication device to perform, by the wireless communication with the transport vehicle-side communication device in a predetermined cycle, an interlock communication for transferring the object between the port and the transport vehicle; and performing control to cause a transmission timing of a signal related to the interlock communication to differ from a transmission timing of a signal related to the interlock communication performed by the other transport vehicle, when the other transport vehicle is determined to be performing the interlock communication using the channel.

Accordingly, even when a plurality of transport vehicles performing interlock communications using the same channel are present relatively close to one another, wireless communication interference is unlikely to occur since the transmission timings of signals related to the interlock communications are different from one another. In other words, communication error in an interlock communication between a transport vehicle and a port-side communication device can be reduced.

This disclosure is directed not only to a device but also a method that uses a processing means for configuring the device as steps, a program to cause a computer to perform these steps, a computer-readable recording medium such as a CD-ROM, which stores the program, or information, data, or a signal indicating the program. Moreover, the program, information, data, or signal may be distributed via a communication network such as the Internet.

Our wireless communication system or the like can thus reduce communication error in an interlock communication between a transport vehicle and a port-side communication device.

BRIEF DESCRIPTION OF THE DRAWINGS

FIG. 6 is a diagram illustrating an example of a management table.

REFERENCE SIGNS LIST

Figure 1:
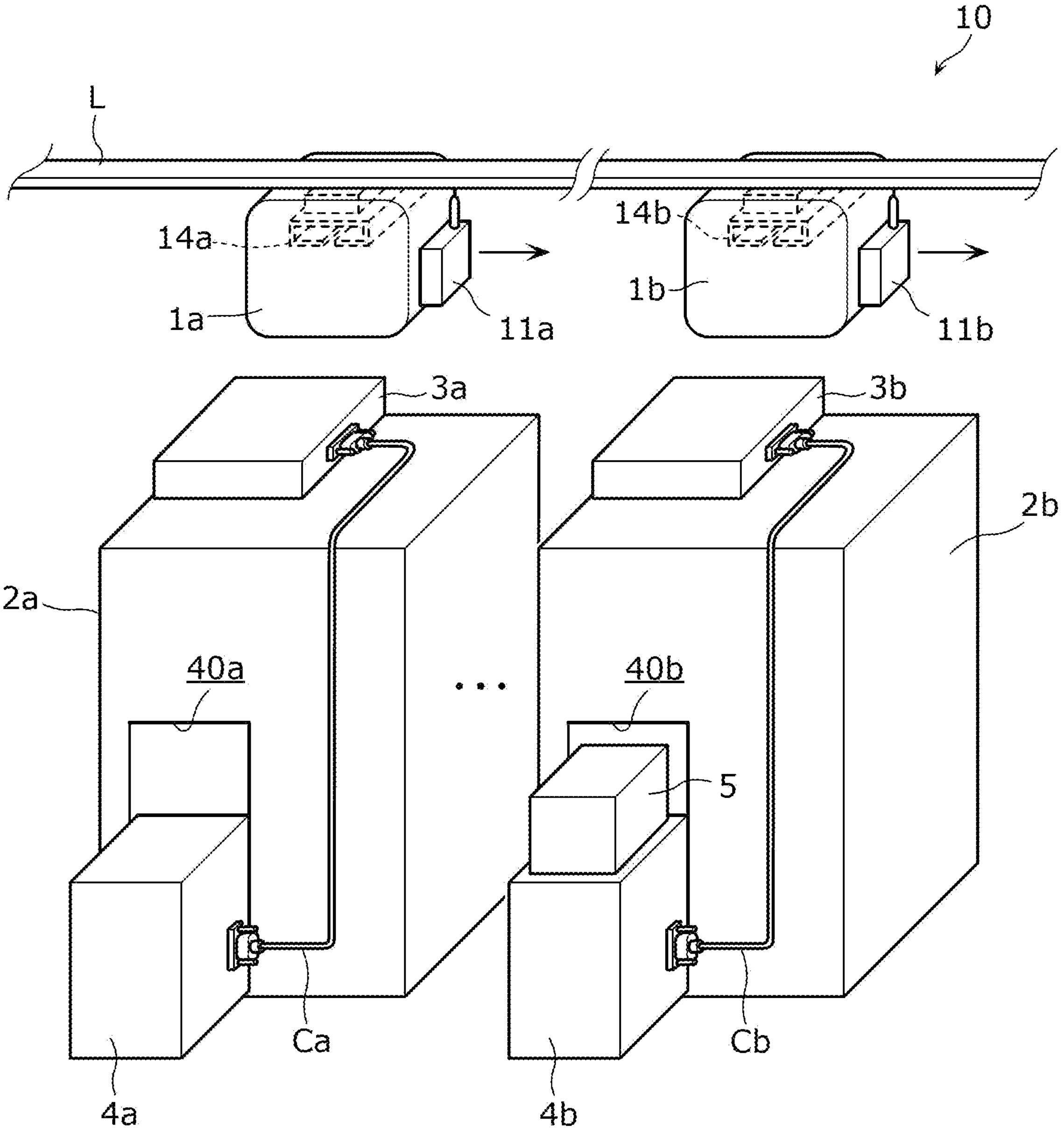
FIG. 1 is a diagram illustrating an overview of a wireless communication system according to an example.

1,1*a* to 1*c* transport vehicle
10 wireless communication system
11,11*a* to 11 *c* transport vehicle-side communication device
111 determiner
112 processing unit
113 detector
12,32,42 controller
13 storage
14,14*a*,14 *b* holder
2,2*a* to 2*c*,100 semiconductor processing device
3,3*a* to 3 *c* port-side communication device
31,41 communicator
4,4*a* to 4 *c* port
40*a*,40*b* loading/unloading gate
5 FOUP (object)
61 communication frame
62 management table
A1 to A3 area
L track

DETAILED DESCRIPTION

Hereinafter, an example is described with reference to the accompanying Drawings. The example described below shows a general or specific example of our systems, devices and methods. The numerical values, shapes, materials, constituent elements, the arrangement and connection of the constituent elements, steps, order of the steps and the like shown in the following example are merely examples, and therefore do not limit this disclosure. Moreover, among the constituent elements in the following example, a constituent element not recited in any one of the independent claims is described as an arbitrary constituent element.

EXAMPLE

1. Overview of Wireless Communication System

Figure 2:
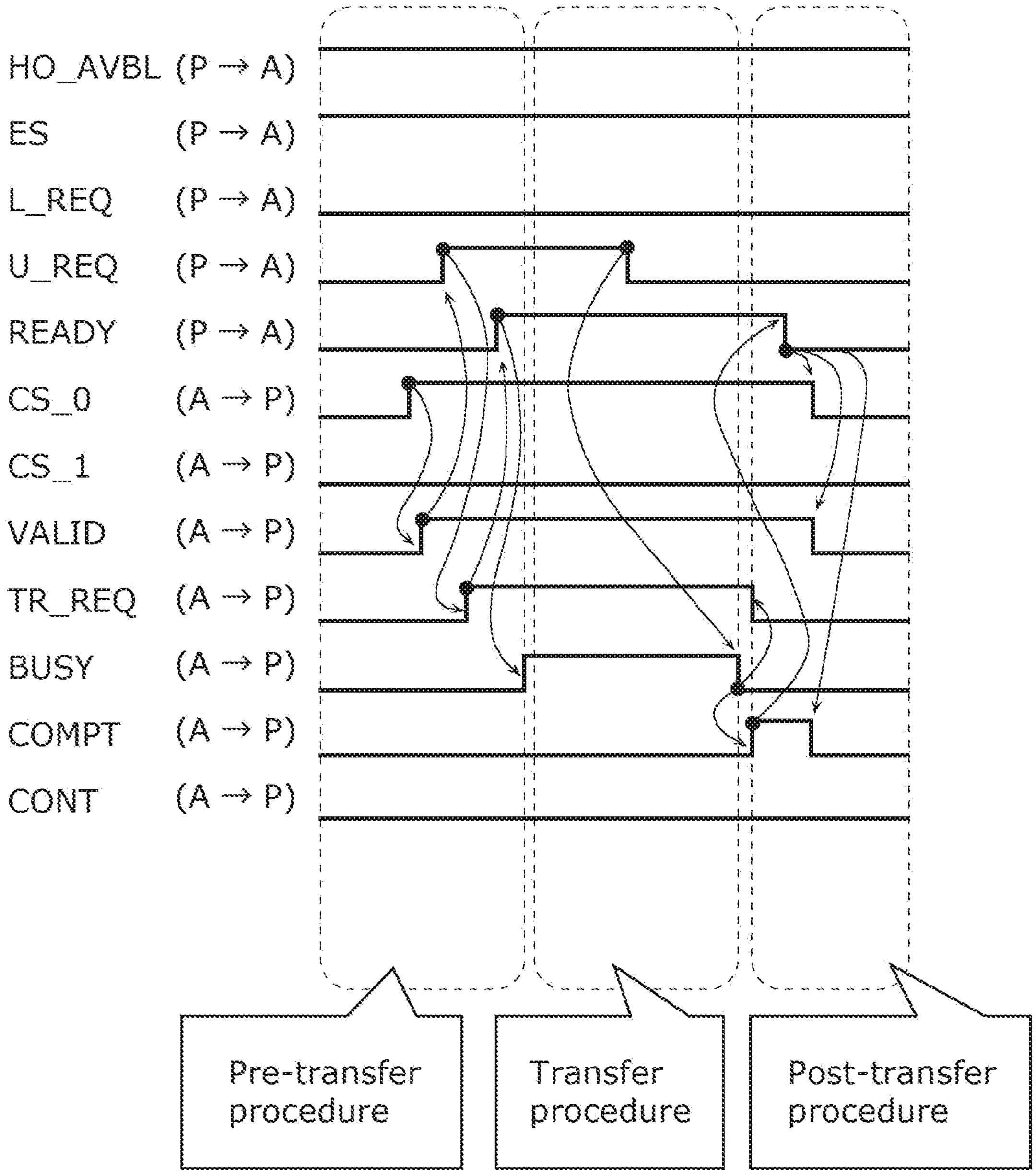
FIG. 2 is a diagram illustrating an example of an E84 interlock sequence for picking up a FOUP.
Figure 3:
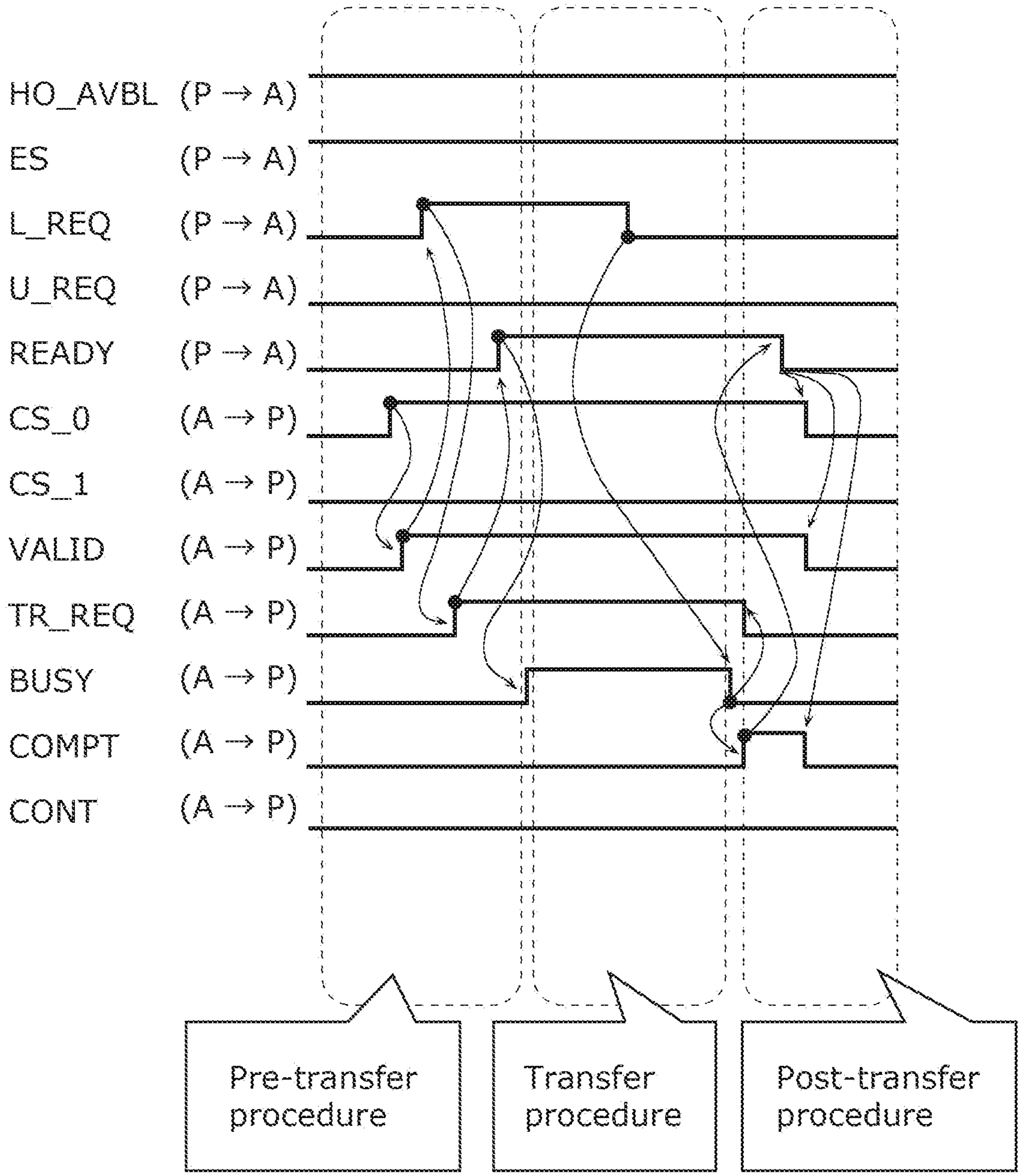
FIG. 3 is a diagram illustrating an example of an E84 interlock sequence for unloading a FOUP.

First, an overview of wireless communication system 10 according to an example is described with reference to FIGS. 1 to 3. FIG. 1 is a diagram illustrating the overview of wireless communication system 10 according to the example. FIG. 2 is a diagram illustrating an example of an E84 interlock sequence for picking up a Front Opening Unified Pod (FOUP) 5. FIG. 3 is a diagram illustrating an example of an E84 interlock sequence for unloading FOUP 5. "E84 interlock sequence" is a sequence defined by the E84 standard related to Semiconductor Equipment and Materials International (SEMI).

As illustrated in FIG. 1, wireless communication system 10 is a system constructed in a semiconductor manufacturing plant, for example. In the example illustrated in FIG. 1, first transport vehicle 1*a*, second transport vehicle 1*b*, first semiconductor processing device 2*a*, and second semiconductor processing device 2*b* are provided in the semiconductor manufacturing plant in which wireless communication system 10 has been constructed. Moreover, first transport vehicle 1*a* and second transport vehicle 1*b* are equipped with first transport vehicle-side communication device 11*a* and second transport vehicle-side communication device 11*b*, respectively. Furthermore, first semiconductor processing device 2*a* and second semiconductor processing device 2*b* are equipped with first port-side communication device 3*a* and second port-side communication device 3*b*, respectively.

Although a lot of (e.g., several hundreds of) transport vehicles are provided in the semiconductor manufacturing plant actually, only first transport vehicle 1*a* and second transport vehicle 1*b* are illustrated in FIG. 1 for the sake of simplicity. Moreover, although a lot of (e.g., several thousands of) semiconductor processing devices are provided in the semiconductor manufacturing plant actually, only first semiconductor processing device 2*a* and second semiconductor processing device 2*b* are illustrated in FIG. 1 for the sake of simplicity.

First transport vehicle 1*a* is an overhead-traveling transport vehicle for transporting FOUP 5 in which a semiconductor wafer is stored. First transport vehicle 1*a* is a so-called Overhead Hoist Transfer (OHT). FOUP 5 is an example of an object to be transported by transport vehicle 1 (to be described later). Hereinafter, it is assumed that an object to be transported is FOUP 5 unless otherwise stated. First transport vehicle 1*a* travels unmanned along track L provided on the ceiling of the semiconductor manufacturing plant. For example, track L is provided in a way that track L is suspended from the ceiling of the semiconductor manufacturing plant. Although track L in the example is in a straight-line shape as illustrated in FIG. 1, this disclosure is not limited to this example. For example, track L may be in a shape made of straight lines and curved lines, or in a grid-like shape.

Holder 14*a* for holding FOUP 5 is provided inside first transport vehicle 1*a*. Holder 14*a* is capable of ascending and descending with respect to first transport vehicle 1*a*. For example, when FOUP 5 is transferred between first transport vehicle 1*a* and first port 4*a* (to be described later) of first semiconductor processing device 2*a*, holder 14*a* descends, from the position where holder 14*a* is stored inside first transport vehicle 1*a*, to the vicinity of first port 4*a*, in a state in which first transport vehicle 1*a* is stopped directly above first port 4*a*. Moreover, when the transfer of FOUP 5 is completed, holder 14*a* ascends from the vicinity of first port 4*a* to first transport vehicle 1*a*, and then is stored inside first transport vehicle 1*a*.

Furthermore, first transport vehicle-side communication device 11*a* is provided on a side surface of first transport vehicle 1*a*. First transport vehicle-side communication device 11*a* is configured to perform wireless communication with each of first port-side communication device 3*a* and second port-side communication device 3*b*.

Similar to first transport vehicle 1*a*, second transport vehicle 1*b* is an overhead-traveling transport vehicle for transporting FOUP 5 in which a semiconductor wafer is stored. Similar to first transport vehicle 1*a*, second transport vehicle 1*b* travels unmanned along track L provided on the ceiling of the semiconductor manufacturing plant. The track along which first transport vehicle 1*a* travels and the track along which second transport vehicle 1*b* travels may be different from each other. Moreover, first transport vehicle 1*a* and second transport vehicle 1*b* may travel along the same track or different tracks, or each may possibly change its track to another track at an intersection of tracks.

Similar to first transport vehicle 1*a*, holder 14*b* for holding FOUP 5 is provided inside second transport vehicle 1*b*. Holder 14*b* is capable of ascending and descending with respect to second transport vehicle 1*b*.

Moreover, second transport vehicle-side communication device 11*b* is provided on a side surface of second transport vehicle 1*b*. Similar to first transport vehicle-side communication device 11*a*, second transport vehicle-side communication device 11*b* is configured to perform wireless communication with each of first port-side communication device 3*a* and second port-side communication device 3*b*.

First transport vehicle-side communication device 11*a* is configured to intercept wireless communication between first port 4*a* or second port 4*b* and another transport vehicle, that is, a transport vehicle other than first transport vehicle 1*a*, as described later.

Each of first semiconductor processing device 2*a* and second semiconductor processing device 2*b* is a device for processing or temporarily placing the semiconductor wafer stored in FOUP 5, for example. In the example illustrated in FIG. 1, first semiconductor processing device 2*a* and second semiconductor processing device 2*b* are arranged in a row directly below track L. Each of first semiconductor processing device 2*a* and second semiconductor processing device 2*b* may be arranged directly below a different one of tracks.

First semiconductor processing device 2*a* includes first loading/unloading gate 40*a* through which the semiconductor wafer stored in FOUP 5 is to be loaded to or unloaded from first semiconductor processing device 2*a*, and first port 4*a* disposed in the vicinity of first loading/unloading gate 40*a*. Moreover, second semiconductor processing device 2*b* includes second loading/unloading gate 40*b* through which the semiconductor wafer stored in FOUP 5 is to be loaded to or unloaded from second semiconductor processing device 2*b*, and second port 4*b* disposed in the vicinity of second loading/unloading gate 40*b*.

First port 4*a* is a load port on which FOUP 5 is to be placed. FOUP 5 is transferred between holder 14*a* of first transport vehicle 1*a* (or holder 14*b* of second transport vehicle 1*b*) and first port 4*a*. The semiconductor wafer stored in FOUP 5 is transferred between first port 4*a* and first semiconductor processing device 2*a* through first loading/unloading gate 40*a*.

Similar to first port 4*a*, second port 4*b* is a load port on which FOUP 5 is to be placed. FOUP 5 is transferred between holder 14*a* of first transport vehicle 1*a* (or holder 14*b* of second transport vehicle 1*b*) and second port 4*b*. The semiconductor wafer stored in FOUP 5 is transferred between second port 4*b* and second semiconductor processing device 2*b* through second loading/unloading gate 40*b*.

First port-side communication device 3*a* is a device server for relaying communication between first transport vehicle-side communication device 11*a* and first port 4*a* of first semiconductor processing device 2*a* as well as communication between second transport vehicle-side communication device 11*b* and first port 4*a* of first semiconductor processing device 2*a*. First port-side communication device 3*a* is disposed on the top surface of first semiconductor processing device 2*a* and connected to first port 4*a* of first semiconductor processing device 2*a* via parallel cable Ca. Accordingly, first port-side communication device 3*a* can perform wired communication with first port 4*a* of first semiconductor processing device 2*a* via parallel cable Ca. Moreover, first port-side communication device 3*a* can perform wireless communication with each of first transport vehicle-side communication device 11*a* and second transport vehicle-side communication device 11*b*, by short-range wireless communication or the like through Bluetooth (registered trademark) Low Energy (BLE), for example. In the example, the frequency band used in the wireless communication is, for example, 2.4 GHz or 5.8 GHz. Moreover, the short-range wireless communication or the like may include wireless communication standard (e.g., ANT communication) that establishes a pairing between a master and a slave for wireless communication.

Second port-side communication device 3*b* is a device server for relaying communication between first transport vehicle-side communication device 11*a* and second port 4*b* of second semiconductor processing device 2*b* as well as communication between second transport vehicle-side communication device 11*b* and second port 4*b* of second semiconductor processing device 2*b*. Second port-side communication device 3*b* is disposed on the top surface of second semiconductor processing device 2*b* and connected to second port 4*b* of second semiconductor processing device 2*b* via parallel cable Cb. Accordingly, second port-side communication device 3*b* can perform wired communication with second port 4*b* of second semiconductor processing device 2*b* via parallel cable Cb. Moreover, second port-side communication device 3*b* can perform wireless communication with each of first transport vehicle-side communication device 11*a* and second transport vehicle-side communication device 11*b*, by short-range wireless communication or the like through BLE, for example.

When FOUP 5 placed on first port 4*a* is picked up by first transport vehicle 1*a* and when FOUP 5 is unloaded from first transport vehicle 1*a* to first port 4*a* are described, for example. In these examples, in the above-described wireless communication system 10, control signals ("communication data") are exchanged between first transport vehicle-side communication device 11*a* and first port-side communication device 3*a*, by an interlock communication in accordance with an E84 interlock sequence of SEMI. The interlock communication is communication for transferring object (FOUP) 5 between a port (first port 4*a* or second port 4*b*) and a transport vehicle (first transport vehicle 1*a* or second transport vehicle 1*b*). When FOUP 5 is transferred between first transport vehicle 1*a* and first port 4*a*, an interlock sequence consisting of a plurality of procedures that does not allow a procedure to proceed to the next procedure unless a particular control signal (e.g., "L_REQ") becomes OFF is adopted as an E84 interlock sequence.

As illustrated in FIG. 2, an E84 interlock sequence for picking up FOUP 5 consists of three procedures: a pre-transfer procedure, a transfer procedure, and a post-transfer procedure. Moreover, as illustrated in FIG. 3, similar to FIG. 2, an E84 interlock sequence for unloading FOUP 5 consists of three procedures: a pre-transfer procedure, a transfer procedure, and a post-transfer procedure. The pre-transfer procedure, the transfer procedure, and the post-transfer procedure are executed after first transport vehicle 1*a* arrives at a position directly above first port 4*a* to/from which FOUP 5 is to be transferred and in a state in which first transport vehicle 1*a* is stopped at the position, for example. Alternatively, the pre-transfer procedure may be executed while first transport vehicle 1*a* is traveling on the side before (upstream side with respect to) the position directly above first port 4*a* to/from which FOUP 5 is to be transferred. Alternatively, the post-transfer procedure may be executed while first transport vehicle 1*a* is traveling on the side after (downstream side with respect to) the position directly above first port 4*a* to/from which FOUP 5 is to be transferred.

As illustrated in FIGS. 2 and 3, in the pre-transfer procedure, control signals indicating that transfer of FOUP 5 will be started are exchanged between first transport vehicle-side communication device 11*a* and first port-side communication device 3*a* (first port 4*a*). In the transfer procedure, control signals for performing the transfer of FOUP 5 are exchanged between first transport vehicle-side communication device 11*a* and first port-side communication device 3*a* (first port 4*a*), and the transfer of FOUP 5 is actually performed. In the post-transfer procedure, control signals indicating that the transfer of FOUP 5 has been completed are exchanged between first transport vehicle-side communication device 11*a* and first port-side communication device 3*a* (first port 4*a*).

2. Functional Configuration of Wireless Communication System

Figure 4:
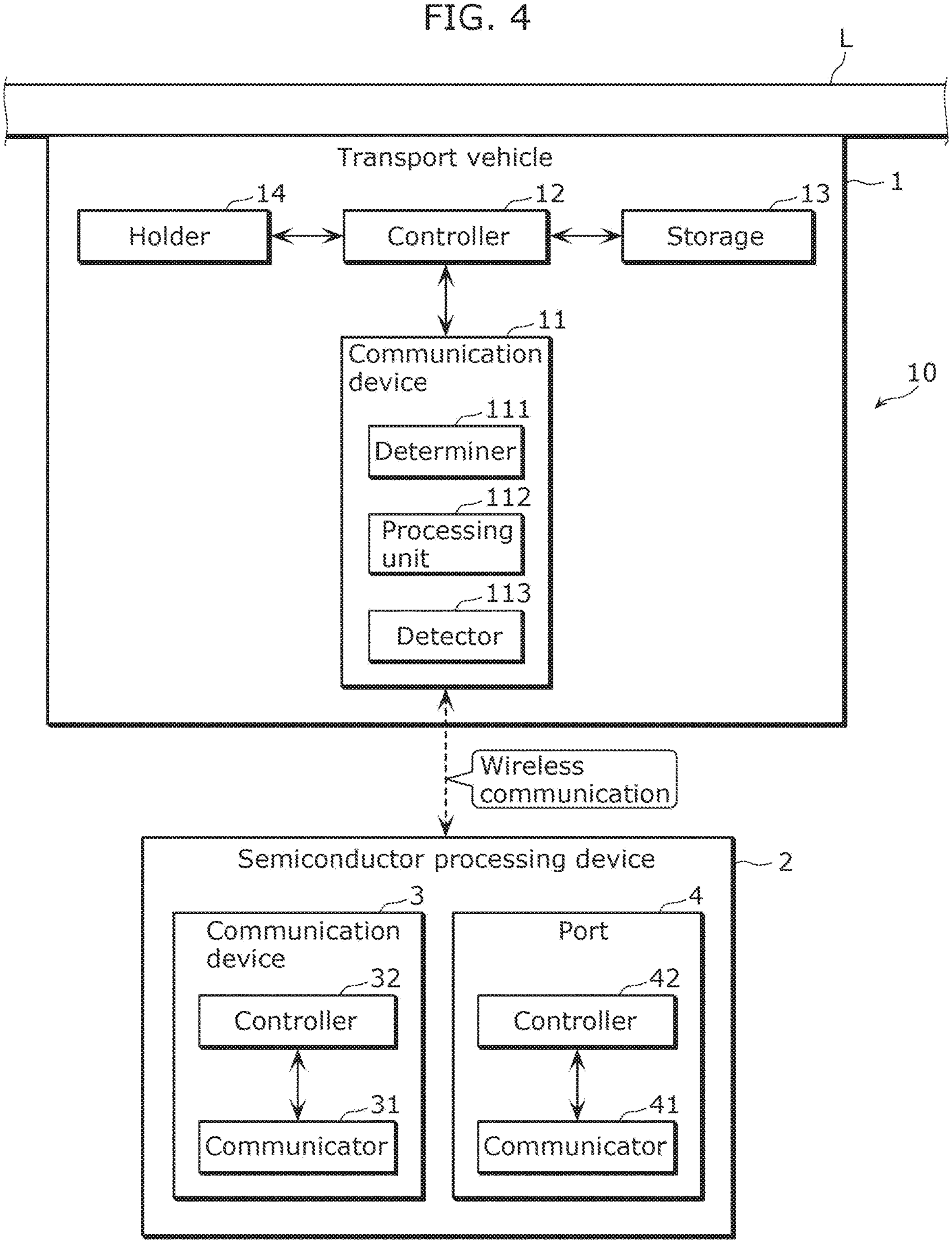
FIG. 4 is a block diagram illustrating a functional configuration of the wireless communication system according to the example.
Figure 5:
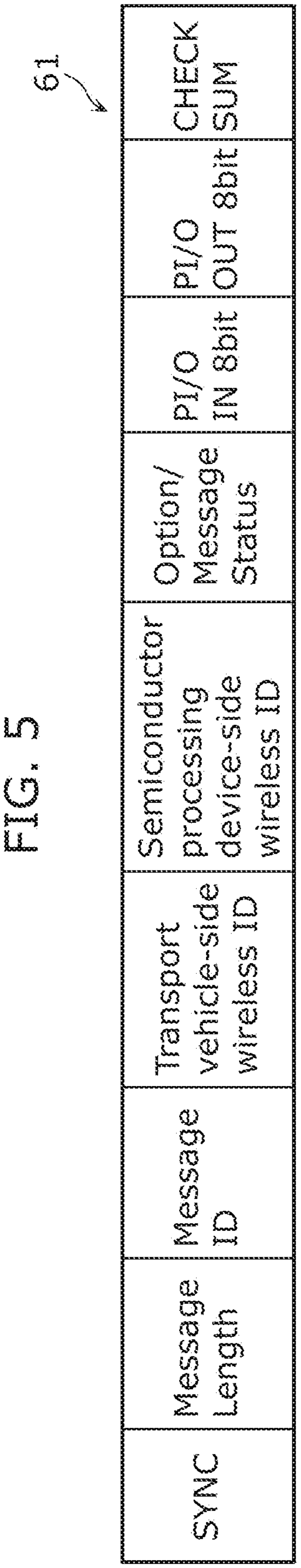
FIG. 5 is a diagram illustrating an example of a communication frame related to an interlock communication.

Hereinafter, a functional configuration of wireless communication system 10 according to the example is described with reference to FIGS. 4 to 6. FIG. 4 is a block diagram illustrating the functional configuration of wireless communication system 10 according to the example. FIG. 5 is a diagram illustrating an example of communication frame 61 related to an interlock communication. FIG. 6 is a diagram illustrating an example of management table 62.

In the description below, first transport vehicle 1*a*, second transport vehicle 1*b* and the like are each referred to as "transport vehicle 1" when they do not need to be differentiated. Moreover, in the description below, holder 14*a* of first transport vehicle 1*a*, holder 14*b* of second transport vehicle 1*b* and the like are each referred to as "holder 14" when they do not need to be differentiated. Furthermore, in the description below, first semiconductor processing device 2*a*, second semiconductor processing device 2*b* and the like are each referred to as "semiconductor processing device 2" when they do not need to be differentiated. Furthermore, in the description below, first transport vehicle-side communication device 11*a*, second transport vehicle-side communication device 11*b* and the like are each referred to as "transport vehicle-side communication device 11" when they do not need to be differentiated. Furthermore, in the description below, first port-side communication device 3*a*, second port-side communication device 3*b* and the like are each referred to as "port-side communication device 3" when they do not need to be differentiated. Furthermore, in the description below, first port 4*a*, second port 4*b* and the like are each referred to as "port 4" when they do not need to be differentiated.

As illustrated in FIG. 4, wireless communication system 10 includes transport vehicle 1, transport vehicle-side communication device 11, and port-side communication device 3, as the functional configuration. Although transport vehicle-side communication device 11 is included as a constituent element in transport vehicle 1 in FIG. 4, transport vehicle-side communication device 11 is a separate device from transport vehicle 1. Of course, transport vehicle-side communication device 11 may be integrally formed with transport vehicle 1. Moreover, although port-side communication device 3 is included as a constituent element in semiconductor processing device 2 in FIG. 4, port-side communication device 3 is a separate device from semiconductor processing device 2. Of course, port-side communication device 3 may be integrally formed with semiconductor processing device 2.

Although description is carried out focusing on a single transport vehicle 1 and a single port 4, there may be a plurality of transport vehicles 1 and a plurality of ports 4 as targets for wireless communication system 10. In this configuration, wireless communication system 10 includes a plurality of transport vehicles 1, a plurality of transport vehicle-side communication devices 11, and a plurality of port-side communication devices 3.

Transport vehicle-side communication device 11 is connected to transport vehicle 1 and exchanges communication data related to an interlock communication by wireless communication with port-side communication device 3.

As an example, communication data related to an interlock communication that is exchanged between transport vehicle-side communication device 11 and port-side communication device 3 is described. The communication data related to an interlock communication is, for example, communication frame 61 as illustrated in FIG. 5. Communication frame 61 illustrated in FIG. 5 includes the fields of "SYNC", "Message Length", "Message ID", "Transport vehicle-side wireless ID", "Semiconductor processing device-side wireless ID", "Option/Message Status", "PI/O IN 8bit", "PI/O OUT 8bit", and "CHECK SUM".

"SYNC" is the SYNC part of communication frame 61. "Message Length" is the data length from "Message ID" to "PI/O OUT 8bit" in communication frame 61. "Message ID" is the unique identifier of communication frame 61. "Transport vehicle-side wireless ID" is identification information of transport vehicle-side communication device 11, that is, identification information of transport vehicle 1. "Semiconductor processing device-side wireless ID" is identification information of port-side communication device 3, that is, identification information of a port of semiconductor processing device 2. "Option/Message Status" is an option instruction and the transmission direction of communication frame 61 (transport vehicle-side communication device 11 to port-side communication device 3, or port-side communication device 3 to transport vehicle-side communication device 11). "PI/O IN 8bit" is parallel I/O data to be inputted into port 4. "PI/O OUT 8bit" is parallel I/O data to be outputted from port 4. "CHECK SUM" is the CHECK SUM part of communication frame 61.

With reference to FIG. 4, transport vehicle-side communication device 11 includes determiner 111, processing unit 112, and detector 113. Determiner 111, processing unit 112, and detector 113 are implemented by, for example, a processor loading and executing a software program recorded on a recording medium such as a hard disk or semiconductor memory.

Before a pairing signal is transmitted, determiner 111 determines whether another transport vehicle 1 is performing an interlock communication using a channel (wireless channel) that is to be used for wireless communication between own transport vehicle-side communication device 11 and port-side communication device 3. The pairing signal is a signal for establishing synchronous wireless communication between transport vehicle-side communication device 11 and port-side communication device 3. After transmitting the pairing signal to port-side communication device 3 and establishing wireless communication with port-side communication device 3, transport vehicle-side communication device 11 performs various communication related to transfer of FOUP5 between transport vehicle 1 and port 4.

Moreover, "another transport vehicle 1 is performing an interlock communication" specifically means a state where a signal related to an interlock communication that is transmitted or received by another transport vehicle-side communication device 11 provided to another transport vehicle 1 and a signal related to an interlock communication that is transmitted or received by (own) transport vehicle-side communication device 11 may interfere with each other.

In other words, before a pairing signal is transmitted, determiner 111 performs monitoring to determine whether another transport vehicle-side communication device 11 that is performing an interlock communication using a channel that is to be used for wireless communication between own transport vehicle-side communication device 11 and port-side communication device 3 is present within a range in which wireless communication by the other transport vehicle-side communication device 11 may interfere with the wireless communication by own transport vehicle-side communication device 11. Operations performed by determiner 111 are described in detail in 3. Operations Performed by Wireless Communication System below.

When determiner 111 determines that another transport vehicle 1 is performing an interlock communication using a channel that is to be used for wireless communication between own transport vehicle-side communication device 11 and port-side communication device 3, processing unit 112 performs control to delay the transmission timing of a signal related to an interlock communication from the transmission timing of a signal related to the interlock communication performed by the other transport vehicle 1. In a state where wireless communication is established between transport vehicle-side communication device 11 and port-side communication device 3, a signal related to an interlock communication includes a command signal transmitted from transport vehicle-side communication device 11 and a response signal transmitted from port-side communication device 3 that has received the command signal.

When determiner 111 determines that another transport vehicle 1 is not performing an interlock communication, processing unit 112 transmits a pairing signal and then, after the lapse of a predetermined time period that is a period from when the monitoring is completed until a predetermined transmission timing, starts transmission of a command signal in a predetermined cycle. In contrast, when determiner 111 determines that another transport vehicle 1 is performing an interlock communication, processing unit 112 transmits a pairing signal and then, after the lapse of a predetermined delay time period from the transmission timing of a signal related to the interlock communication performed by the other transport vehicle 1 that is a target, starts transmission of a command signal in the predetermined cycle. "Target" means another transport vehicle 1 (another transport vehicle-side communication device 11) with respect to which the transmission timing of a signal related to an interlock communication performed by own transport vehicle 1 is to be delayed. In other words, when determiner 111 determines that another transport vehicle 1 is performing an interlock communication, processing unit 112 delays, by the predetermined delay time period, the transmission timing of a signal related to an interlock communication performed by own transport vehicle 1 from the transmission timing of a signal related to the interlock communication performed by the other transport vehicle 1.

In the example, when determiner 111 determines that a plurality of other transport vehicles 1 are performing interlock communications using a channel that is to be used for wireless communication between own transport vehicle-side communication device 11 and port-side communication device 3, processing unit 112 determines a preferential target based on a predetermined algorithm. "Preferential target" is a target when there are a plurality of other transport vehicles 1 that are performing interlock communications using a channel that is to be used for wireless communication between own transport vehicle-side communication device 11 and port-side communication device 3. Another transport vehicle 1 to be determined as a preferential target is, for example, transport vehicle 1 that is most likely to cause wireless communication interference among the plurality of other transport vehicles 1.

In the example, when determiner 111 determines that another transport vehicle 1 is performing an interlock communication, processing unit 112 also delays the transmission timing of a pairing signal. Operations performed by processing unit 112 are described in detail in 3. Operations Performed by Wireless Communication System below.

Detector 113 detects a signal strength of wireless communication related to an interlock communication performed by another transport vehicle 1 (a signal strength of a channel that is to be used for wireless communication between own transport vehicle-side communication device 11 and port-side communication device 3). In the example, detector 113 detects a Received Signal Strength Indicator (RSSI) value of a wireless signal transmitted by another port-side communication device 3, among wireless signals received by transport vehicle-side communication device 11.

Transport vehicle 1 includes controller 12, storage 13, and holder 14.

Controller 12 performs various processes by referring to storage 13 and controlling transport vehicle-side communication device 11. Controller 12 is implemented by, for example, a processor loading and executing a software program recorded on a recording medium such as a hard disk or semiconductor memory.

Storage 13 is memory that stores management table 62. As illustrated in FIG. 6, for example, management table 62 is a data table that shows, for each semiconductor processing device 2 (i.e., for each port 4), the correspondence between the station number of semiconductor processing device 2, the wireless channel of port-side communication device 3, and the device number (identification information) of port-side communication device 3. In the example illustrated in FIG. 6, the station number of semiconductor processing device 2 "00001", the wireless channel of port-side communication device 3 "001", and the device number of port-side communication device 3 "00001" are associated with one another and stored in the first row of management table 62.

Port-side communication device 3 and port 4 are connected by wire. Port-side communication device 3 performs an interlock communication by wireless communication with transport vehicle-side communication device 11 in a predetermined cycle when port-side communication device 3 receives a pairing signal as a trigger from transport vehicle-side communication device 11. Thus, an interlock communication is performed between port 4 connected by wire to port-side communication device 3 and transport vehicle-side communication device 11. Port-side communication device 3 includes communicator 31 and controller 32.

Communicator 31 exchanges communication data related to an interlock communication by wireless communication with transport vehicle-side communication device 11. Specifically, communicator 31 receives a command signal transmitted from transport vehicle-side communication device 11 and transmits a response signal to transport vehicle-side communication device 11. Moreover, communicator 31 exchanges communication data with port 4 via a parallel cable.

Controller 32 performs various processes by controlling communicator 31. Controller 32 is implemented by, for example, a processor loading and executing a software program recorded on a recording medium such as a hard disk or semiconductor memory.

Port 4 is a port to/from which object (FOUP) 5 is to be transferred by transport vehicle 1. Port 4 includes communicator 41 and controller 42.

Communicator 41 exchanges communication data with port-side communication device 3 via a parallel cable.

Controller 42 performs various processes by controlling communicator 41. Specifically, controller 42 performs an interlock process for transferring FOUP 5 between transport vehicle 1 and port 4, based on communication data from port-side communication device 3. Moreover, controller 42 performs a process for transferring the semiconductor wafer stored in FOUP 5 between port 4 and semiconductor processing device 2 through a loading/unloading gate. Controller 42 is implemented by, for example, a processor loading and executing a software program recorded on a recording medium such as a hard disk or semiconductor memory.

3. Operations Performed by Wireless Communication System

Hereinafter, operations performed by wireless communication system 10, specifically, operations performed by transport vehicle-side communication device 11 according to the example are described.

3-1. Basic Operations

Figure 7:
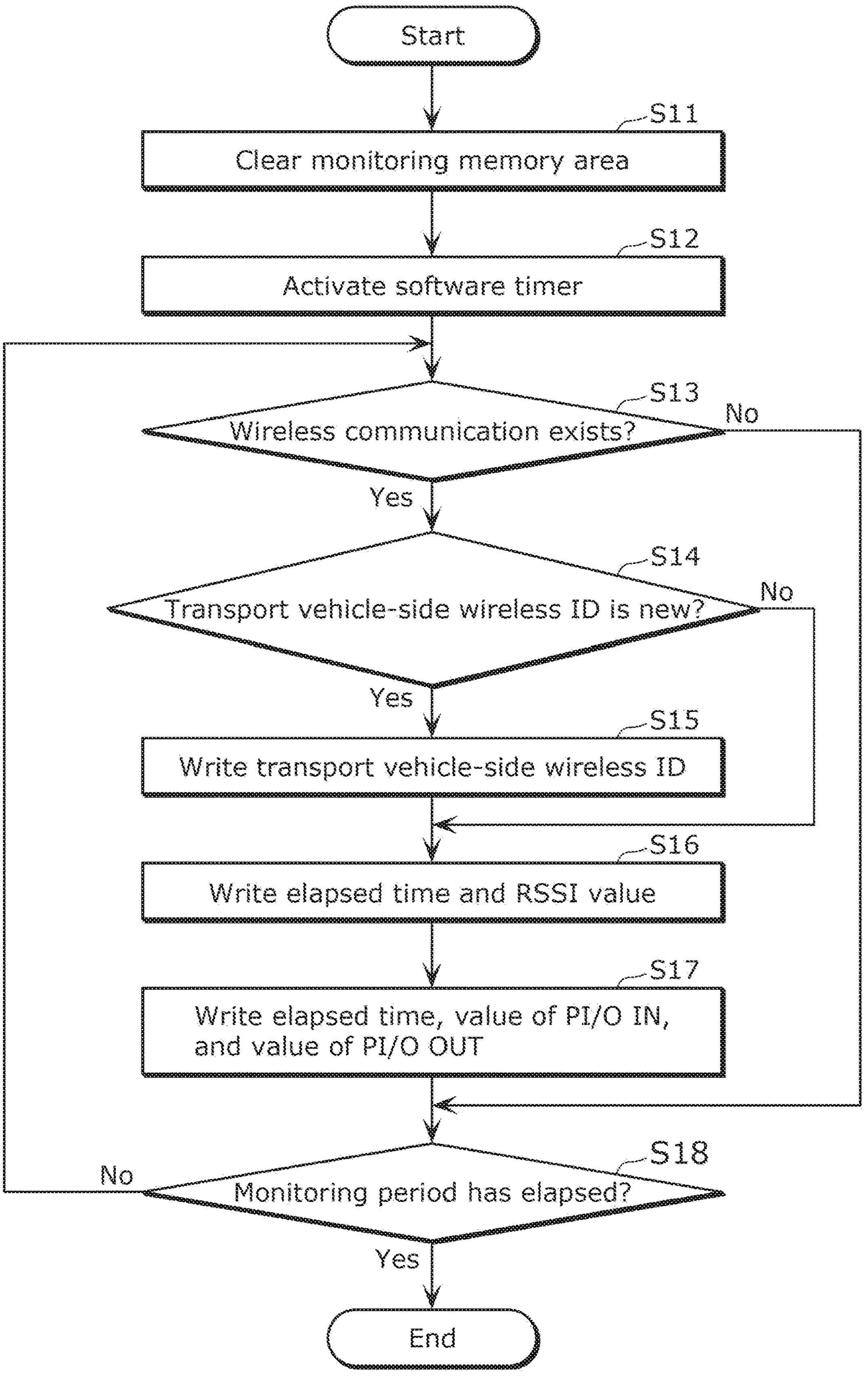
FIG. 7 is a flowchart illustrating an example of a monitoring operation performed by the wireless communication system according to the example.
Figure 8:
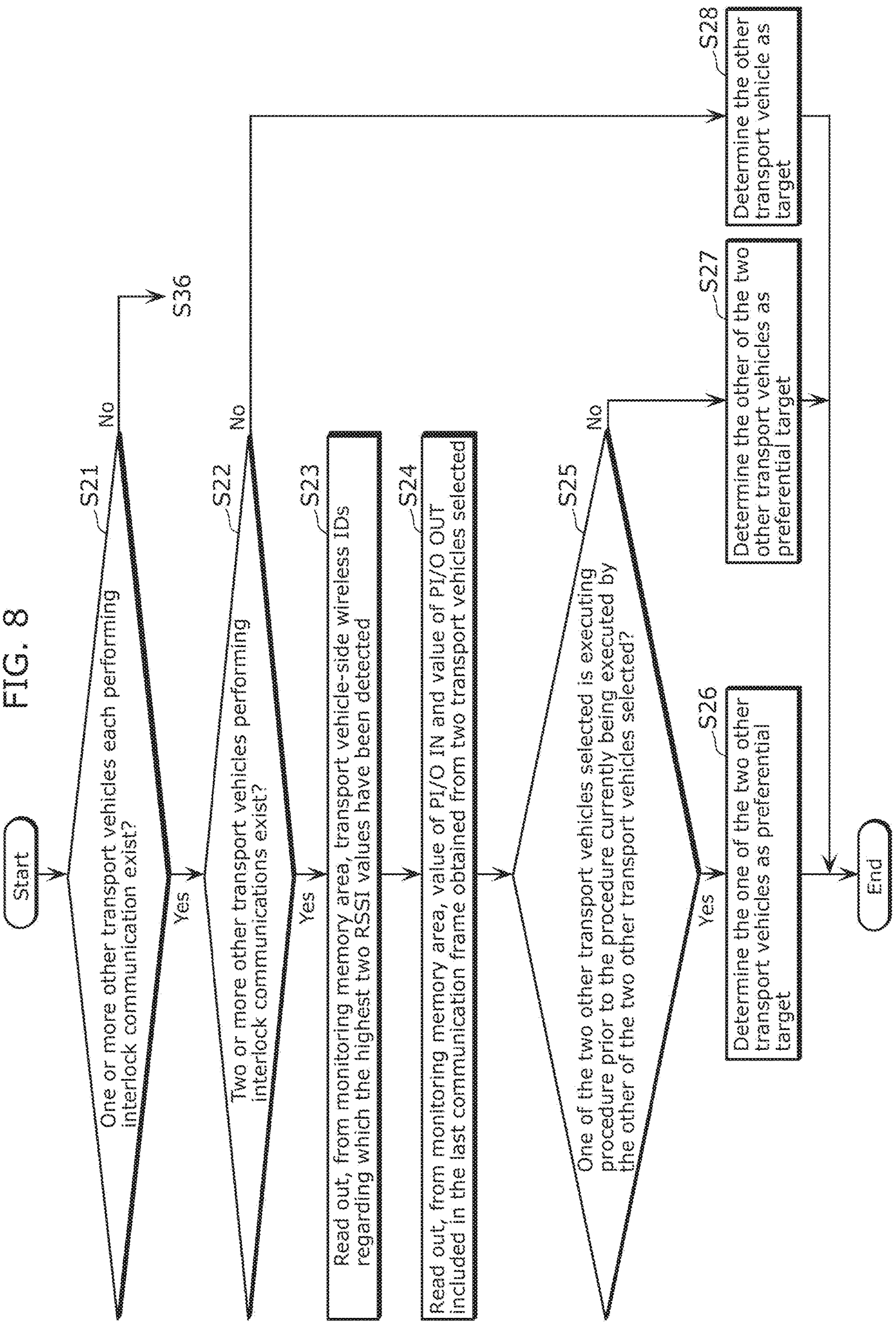
FIG. 8 is a flowchart illustrating an example of a target determination operation performed by the wireless communication system according to the example.
Figure 9:
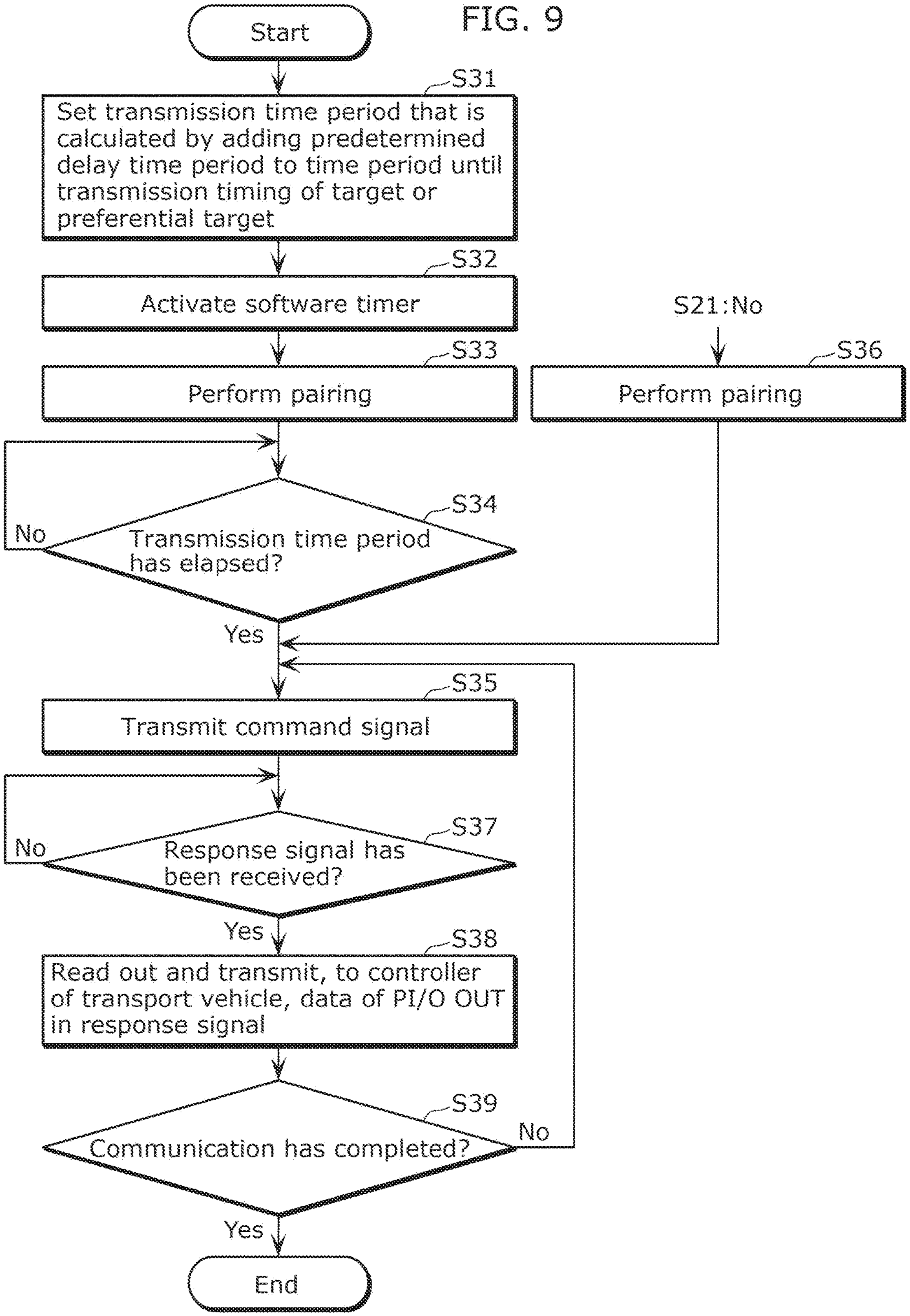
FIG. 9 is a flowchart illustrating an example of an interlock communication operation performed by the wireless communication system according to the example.

First, basic operations performed by wireless communication system 10 (transport vehicle-side communication device 11) are described with reference to FIGS. 7 to 9. FIG. 7 is a flowchart illustrating an example of a monitoring operation performed by wireless communication system 10 according to the example. FIG. 8 is a flowchart illustrating an example of a target determination operation performed by wireless communication system 10 according to the example. FIG. 9 is a flowchart illustrating an example of an interlock communication operation performed by wireless communication system 10 according to the example.

Before the start of transfer of FOUP 5 between transport vehicle 1 and port 4 that is a target, that is, for example, when transport vehicle 1 arrives at a position before or directly above port 4 that is a target for transport vehicle 1, determiner 111 of transport vehicle-side communication device 11 starts the monitoring operation illustrated in FIG. 7. For starting the monitoring operation, determiner 111 first clears (resets) a monitoring memory area in memory built in transport vehicle-side communication device 11 (S11). Then, determiner 111 activates a software timer (S12). Thus, the monitoring operation by determiner 111 is started.

In the monitoring operation, determiner 111 determines whether wireless communication exists between another transport vehicle 1 and another port-side communication device 3 (connected to port 4 other than port 4 that is the target) (S13). When such wireless communication exists (S13: Yes), and when the ID ("transport vehicle-side wireless ID") of the other transport vehicle 1 included in communication frame 61 obtained is new (S14: Yes), determiner 111 writes the transport vehicle-side wireless ID into the monitoring memory area (S15). In contrast, when the transport vehicle-side wireless ID of the other transport vehicle 1 has already been written in the monitoring memory area (S14: No), determiner 111 does not perform step S15.

Next, determiner 111 writes, into the monitoring memory area, the elapsed time of the monitoring operation and the RSSI value detected by detector 113, for each transport vehicle-side wireless ID (S16). Moreover, determiner 111 writes, into the monitoring memory area, the elapsed time of the monitoring operation and the values of PI/O IN (8 bit) and PI/O OUT (8 bit) included in communication frame 61 obtained, for each transport vehicle-side wireless ID (S17). When wireless communication does not exist between another transport vehicle-side communication device 11 and another port-side communication device 3 (S13: No), determiner 111 does not perform steps S14 to S17.

Thereafter, determiner 111 repeats steps S13 to S17 until the monitoring time period elapses after the software timer is activated (S18: No). Then, when the monitoring time period elapses after the software timer is activated (S18: Yes), determiner 111 ends the monitoring operation.

Thus, determiner 111 obtains the transmission timing and reception timing of a signal related to an interlock communication, a predetermined cycle, status of progress of an interlock communication, and an RSSI value, for each transport vehicle 1 other than own transport vehicle 1. "Status of progress of an interlock communication" means progress of transfer of object (FOUP) 5 between another transport vehicle 1 and another port 4 based on communication between transport vehicle-side communication device 11 of the other transport vehicle 1 and port-side communication device 3 of the other port 4. In the example, the status of progress of an interlock communication is an execution stage of any one of a pre-transfer procedure that is executed before object 5 is transferred, a transfer procedure that is executed while object 5 is transferred, or a post-transfer procedure that is executed after object 5 is transferred.

Next, processing unit 112 of transport vehicle-side communication device 11 starts the target determination operation illustrated in FIG. 8. First, processing unit 112 checks whether another transport vehicle 1 performing an interlock communication exists, based on a determination result of determiner 111 (S21, S22). When another transport vehicle 1 performing an interlock communication does not exist (S21: No), processing unit 112 terminates the target determination operation without determining a target. In this example, processing unit 112 performs step S36 of the interlock communication operation to be described later.

When another transport vehicle 1 performing an interlock communication exists (S21: Yes, S22: No), processing unit 112 determines the other transport vehicle 1 as a target (S28), and terminates the target determination operation. In contrast, when two or more other transport vehicles 1 performing interlock communications exist (S22: Yes), processing unit 112 determines a preferential target by performing steps S23 to S27 below.

First, processing unit 112 reads out, from the monitoring memory area, the transport vehicle-side wireless IDs for which the highest two RSSI values have been detected by detector 113 (S23). In other words, processing unit 112 selects transport vehicle 1 for which the highest RSSI value has been detected and transport vehicle 1 for which the second highest RSSI value has been detected, among the two or more other transport vehicles 1 performing the interlock communications. When there are two other transport vehicles 1 performing interlock communications, processing unit 112 reads out, from the monitoring memory area, the transport vehicle-side wireless IDs of the two other transport vehicles 1.

Next, processing unit 112 reads out, from the monitoring memory area, the value of PI/O IN (8 bit) and the value of PI/O OUT (8 bit) included in the last (i.e., the newest) communication frame 61 among communication frames 61 obtained from the two other transport vehicles 1 selected (S24).

The value of PI/O IN (8 bit) and the value of PI/O OUT (8bit) each include information indicating the status of progress of the interlock communication. Specifically, as illustrated in FIGS. 2 and 3, it is possible to determine which of the pre-transfer procedure, the transfer procedure, and the post-transfer procedure each of the two other transport vehicles 1 selected is executing, based on a specific control signal ("CS_0", "BUSY", and "COMPT") in a corresponding E84 interlock sequence. For example, when "CS_0" is ON, "BUSY" is OFF, and "COMPT" is OFF, processing unit 112 determines that a corresponding one of the two other transport vehicles 1 selected is in an execution stage of the pre-transfer procedure. Moreover, for example, when "CS_0" is ON, "BUSY" is ON, and "COMPT" is OFF, processing unit 112 determines that a corresponding one of the two other transport vehicles 1 selected is in an execution stage of the transfer procedure. Furthermore, for example, when "CS_0" is ON, "BUSY" is OFF, and "COMPT" is ON, processing unit 112 determines that a corresponding one of the two other transport vehicles 1 selected is in an execution stage of the post-transfer procedure. When each of "CS 0", "BUSY", and "COMPT" is OFF, processing unit 112 determines that a corresponding one of the two other transport vehicles 1 selected has completed transfer of FOUP 5.

Then, when one of the two other transport vehicles 1 selected is executing a procedure prior to the procedure currently being executed by the other of the two other transport vehicles 1 selected (S25: Yes), processing unit 112 determines the one of the two other transport vehicles 1 selected as a preferential target (S26). Alternatively, when the other of the two other transport vehicles 1 selected is executing a procedure prior to the procedure being executed by the one of the two other transport vehicles 1 selected (S25: No), processing unit 112 determines the other of the two other transport vehicles 1 selected as a preferential target (S27). The pre-transfer procedure is a procedure prior to the transfer procedure, and the transfer procedure is a procedure prior to the post-transfer procedure. In other words, processing unit 112 determines that one of the two other transport vehicles 1 selected that takes a long time to complete transfer of FOUP 5 is transport vehicle 1 for which a time period during which wireless communication interference may occur is long, that is, is likely to cause wireless communication interference, and determines the one of the two other transport vehicles 1 selected as a preferential target. After a preferential target is determined, processing unit 112 terminates the target determination operation.

Next, processing unit 112 starts the interlock communication operation illustrated in FIG. 9. When there is a target or a preferential target determined, that is, when there is another transport vehicle 1 performing an interlock communication, processing unit 112 performs steps S31 to S34, and then steps S35 and S37 to S39 below.

First, processing unit 112 sets a transmission time period that is calculated by adding a predetermined delay time period to a time period until the transmission timing of the target or preferential target (S31). Next, processing unit 112 activates a software timer (S32), and performs pairing with port-side communication device 3 by transmitting a pairing signal (S33).

Processing unit 112 waits without performing anything until the transmission time period elapses after the software timer is activated (i.e., the pairing signal is transmitted) (S34: No). Then, when the transmission time period elapses after the software timer is activated (S34: Yes), processing unit 112 transmits a command signal toward port-side communication device 3 (S35). Thus, transport vehicle-side communication device 11 starts an interlock communication with port-side communication device 3. Control data received from controller 12 of transport vehicle 1 is written into the field of "PI/O IN 8bit" in communication frame 61 of the command signal.

Processing unit 112 waits until receiving a response signal from port-side communication device 3 after the command signal is transmitted (S37: No). Then, when processing unit 112 receives a response signal from port-side communication device 3 (S37: Yes), processing unit 112 reads out and transmits, to controller 12 of transport vehicle 1, the data of "PI/O OUT 8bit" included in the response signal received (S38).

Thereafter, processing unit 112 repeats steps S35 and S37 to S39 until the interlock communication with port-side communication device 3 ends (S39: No). Then, when the interlock communication with port-side communication device 3 ends (S39: Yes), processing unit 112 terminates the interlock communication operation.

When there is no target or preferential target determined, that is, when there is no other transport vehicle 1 performing an interlock communication (S21: No), processing unit 112 does not perform steps S31 to S34 but performs pairing with port-side communication device 3 by transmitting a pairing signal (S36). Then, processing unit 112 performs steps S35 and S37 to S39, similar to when there is a target or preferential target determined.

3-2. Specific Example

Figure 10:
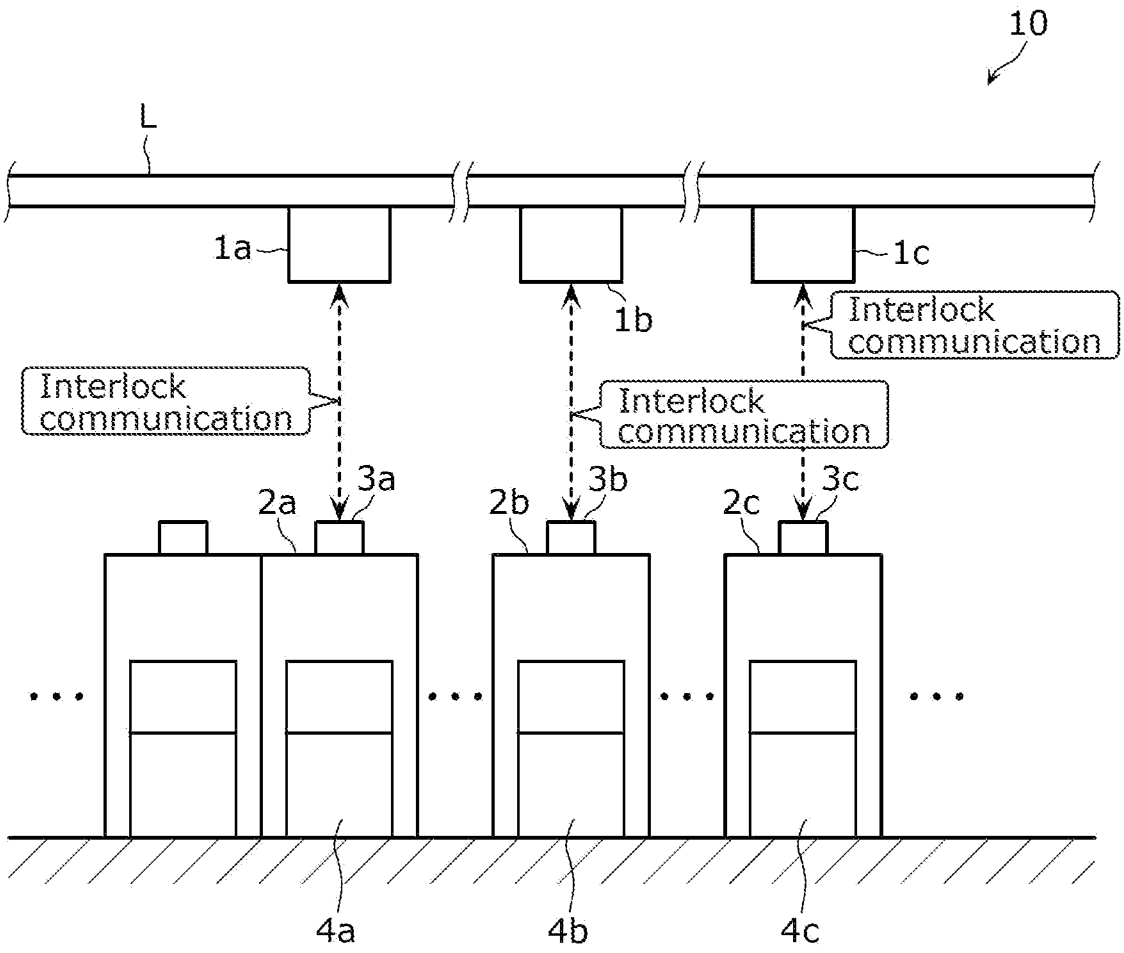
FIG. 10 is a diagram for describing a specific example of operations performed by the wireless communication system according to the example.
Figure 11:
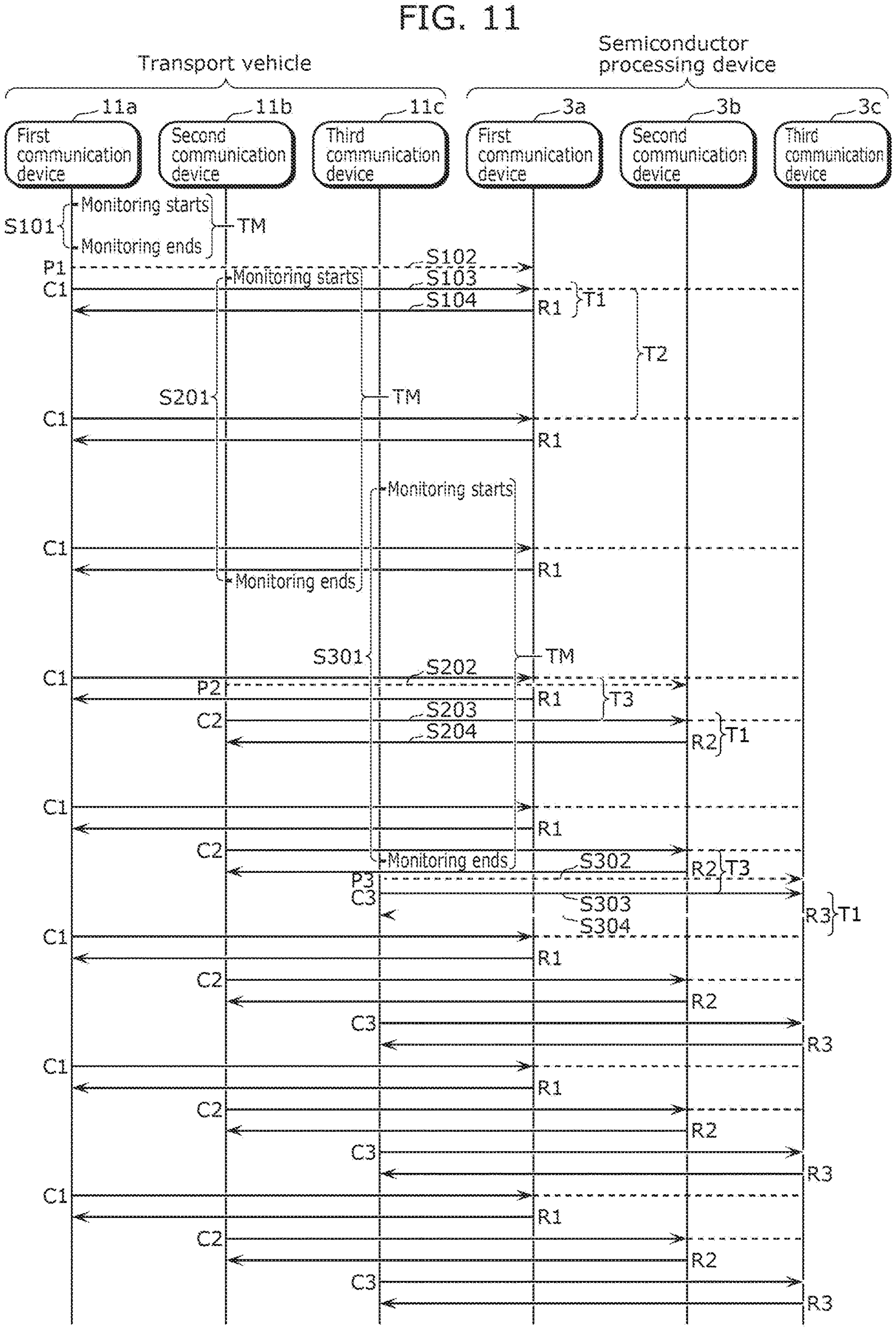
FIG. 11 is a sequence diagram illustrating the flow of a specific example of operations performed by the wireless communication system according to the example.

Hereinafter, a specific example of operations performed by wireless communication system 10 (transport vehicle-side communication device 11) according to the example is described with reference to FIGS. 10 and 11. FIG. 10 is a diagram for describing a specific example of operations performed by wireless communication system 10 according to the example. FIG. 11 is a sequence diagram illustrating the flow of a specific example of operations performed by wireless communication system 10 according to the example.

Hereinafter, as illustrated in FIG. 10, it is assumed that first semiconductor processing device 2*a*, second semiconductor processing device 2*b*, and third semiconductor processing device 2*c* are arranged in a row in the stated order in a semiconductor manufacturing plant. There are other semiconductor processing devices 2 in addition to semiconductor processing devices 2*a* to 2*c* in the semiconductor manufacturing plant. Since first transport vehicle 1*a*, second transport vehicle 1*b*, first semiconductor processing device 2*a*, second semiconductor processing device 2*b*, first port-side communication device 3*a*, second port-side communication device 3*b*, first port 4*a*, and second port 4*b* in the description below have already been described with reference to FIG. 1, the descriptions thereof are omitted here.

In the example illustrated in FIG. 10, third transport vehicle 1*c* is further provided in addition to first transport vehicle 1*a* and second transport vehicle 1*b* in the semiconductor manufacturing plant. Moreover, third semiconductor processing device 2*c* includes third port 4*c*. Third port 4*c* is connected to third port-side communication device 3*c*.

Similar to transport vehicles 1*a* and 1*b* illustrated in FIG. 1, third transport vehicle 1*c* is an overhead-traveling transport vehicle for transporting FOUP 5 in which a semiconductor wafer is stored. Similar to transport vehicles 1*a* and 1*b*, third transport vehicle 1*c* travels unmanned along track L provided on the ceiling of the semiconductor manufacturing plant. Each of transport vehicles 1*a* to 1*c* may travel along a different track. Moreover, each of transport vehicles 1*a* to 1*c* may travel along the same track or a different track, and may possibly change its track to another track at an intersection of tracks.

Similar to transport vehicles 1*a* and 1*b*, a holder (not illustrated) for holding FOUP 5 is provided inside third transport vehicle 1*c*. The holder is capable of ascending and descending with respect to third transport vehicle 1*c*.

Moreover, third transport vehicle-side communication device 11*c* is provided on a side surface of third transport vehicle 1*c*. Similar to transport vehicle-side communication devices 11*a* and 11*b*, third transport vehicle-side communication device 11*c* is configured to perform wireless communication with each of port-side communication devices 3*a* to 3*c*.

Third transport vehicle-side communication device 11*c* is configured to intercept wireless communication between any one of ports 4*a* to 4*c* and another transport vehicle, that is, a transport vehicle other than third transport vehicle 1*c*.

Similar to semiconductor processing devices 2*a* and 2*b* illustrated in FIG. 1, third semiconductor processing device 2*c* is a device for processing or temporarily placing the semiconductor wafer stored in FOUP 5. In the example illustrated in FIG. 10, third semiconductor processing device 2*c* is disposed directly below track L so that semiconductor processing devices 2*a* to 2*c* are aligned in a row. Each of semiconductor processing devices 2*a* to 2*c* may be disposed directly below a different track.

Third semiconductor processing device 2*c* includes a third loading/unloading gate through which the semiconductor wafer stored in FOUP 5 is to be loaded to or unloaded from third semiconductor processing device 2*c*, and third port 4*c* disposed in the vicinity of the third loading/unloading gate.

Third port 4*c* is a load port on which FOUP 5 is to be placed. The holder of each of transport vehicles 1*a* to 1*c* transfers FOUP 5 to/from third port 4*c*. The semiconductor wafer stored in FOUP 5 is transferred between third port 4*c* and third semiconductor processing device 2*c* through the third loading/unloading gate.

Third port-side communication device 3*c* is a device server for relaying communication between each of transport vehicle-side communication devices 11*a* to 11*c* and third port 4*c* of third semiconductor processing device 2*c*. Third port-side communication device 3*c* is disposed on the top surface of third semiconductor processing device 2*c* and connected to third port 4*c* of third semiconductor processing device 2*c* via a parallel cable. Accordingly, third port-side communication device 3*c* can perform wired communication with third port 4*c* of third semiconductor processing device 2*c* via the parallel cable. Moreover, third port-side communication device 3*c* can perform wireless communication with each of transport vehicle-side communication devices 11*a* to 11*c*, by short-range wireless communication or the like through Bluetooth (registered trademark) Low Energy (BLE), for example.

Furthermore, in the description below, it is assumed that first transport vehicle 1*a*, second transport vehicle 1*b*, and third transport vehicle 1*c* are instructed to transfer FOUP 5 by a superordinate controller (not illustrated).

Specifically, first transport vehicle 1*a* travels along track L and stops at a position directly above first port 4*a* to which FOUP 5 is to be transferred. Second transport vehicle 1*b* travels along track L and stops at a position directly above second port 4*b* to which FOUP 5 is to be transferred. Third transport vehicle 1*c* travels along track L and stops at a position directly above third port 4*c* to which FOUP 5 is to be transferred. First transport vehicle 1*a*, second transport vehicle 1*b*, and third transport vehicle 1*c* include first transport vehicle-side communication device 11*a*, second transport vehicle-side communication device 11*b*, and third transport vehicle-side communication device 11*c*, respectively.

Moreover, in the description below, it is assumed that an interlock communication between first transport vehicle-side communication device 11*a* and first port-side communication device 3*a*, an interlock communication between second transport vehicle-side communication device 11*b* and second port-side communication device 3*b*, and an interlock communication between third transport vehicle-side communication device 11*c* and third port-side communication device 3*c* are performed using the same wireless channel. In other words, these interlock communications may sometimes interfere with one another. The state where first transport vehicle 1*a*, second transport vehicle 1*b*, and third transport vehicle 1*c* are performing interlock communications at the same time is illustrated in FIG. 10.

In the example illustrated in FIG. 11, first transport vehicle-side communication device 11*a* ("first communication device 11*a*" in the drawing) starts an interlock communication with first port-side communication device 3*a* ("first communication device 3*a*" in the drawing). Next, second transport vehicle-side communication device 11*b* ("second communication device 11*b*" in the drawing) starts an interlock communication with second port-side communication device 3*b* ("second communication device 3*b*" in the drawing). Lastly, third transport vehicle-side communication device 11*c* ("third communication device 11*c*" in the drawing) starts an interlock communication with third port-side communication device 3*c* ("third communication device 3*c*" in the drawing).

First, first transport vehicle-side communication device 11*a* performs monitoring during monitoring time period TM (S101). Monitoring time period TM is several hundreds of ms, for example. There is no other transport vehicle 1 that is performing an interlock communication. Therefore, after the monitoring ends, first transport vehicle-side communication device 11*a* transmits pairing signal P1 (S102) and, after a predetermined time period elapses, transmits command signal C1 (S103). Thus, first transport vehicle-side communication device 11*a* starts an interlock communication with first port-side communication device 3*a*. In the interlock communication, first transport vehicle-side communication device 11*a* repeats, in predetermined cycle T2, a series of operations, that is, transmitting command signal C1 (S103) and, after predetermined time period T1, receiving response signal R1 from first port-side communication device 3*a* (S104). Predetermined time period T1 is a time period shorter than delay time period T3 (to be described later), and is several hundreds of μs, for example. Moreover, predetermined cycle T2 is a time period longer than delay time period T3 and shorter than monitoring time period TM, and is several tens of ms, for example.

Next, second transport vehicle-side communication device 11*b* performs monitoring during monitoring time period TM (S201). There is the other transport vehicle 1 (first transport vehicle 1*a*) performing the interlock communication. Therefore, second transport vehicle-side communication device 11*b* determines first transport vehicle 1*a* as a target. Then, second transport vehicle-side communication device 11*b* transmits pairing signal P2 (S202), and then transmits command signal C2 at a timing delayed by delay time period T3 from the transmission timing of command signal C1 by first transport vehicle-side communication device 11*a* (S203). Delay time period T3 is a time period longer than predetermined time period T1 and shorter than predetermined cycle T2, and is 1 ms, for example. Thus, second transport vehicle-side communication device 11*b* starts an interlock communication with second port-side communication device 3*b*. Since an interval between the transmission timing of pairing signal P2 and the transmission timing of command signal C2 is fixed, the transmission timing of pairing signal P2 is delayed according to the delay of the transmission timing of command signal C2.

In the interlock communication, second transport vehicle-side communication device 11*b* repeats, in predetermined cycle T2, a series of operations, that is, transmitting command signal C2 (S203) and, after predetermined time period T1, receiving response signal R2 from second port-side communication device 3*b* (S204). Therefore, the transmission timing of a signal related to the interlock communication by first transport vehicle 1*a* and the transmission timing of a signal related to the interlock communication by second transport vehicle 1*b* are basically different from each other by delay time period T3, and wireless communication interference is unlikely to occur.

Lastly, third transport vehicle-side communication device 11*c* performs monitoring during monitoring time period TM (S301). There are the two other transport vehicles 1 (first transport vehicle 1*a* and second transport vehicle 1*b*) performing the interlock communications. Accordingly, third transport vehicle-side communication device 11*c* determines either first transport vehicle 1*a* or second transport vehicle 1*b* as a preferential target. It is assumed that third transport vehicle-side communication device 11*c* has determined second transport vehicle 1*b* as a preferential target.

Then, third transport vehicle-side communication device 11*c* transmits pairing signal P3 (S302), and then transmits command signal C3 at a timing delayed by delay time period T3 from the transmission timing of command signal C2 by second transport vehicle-side communication device 11*b* (S303). Thus, third transport vehicle-side communication device 11*c* starts an interlock communication with third port-side communication device 3*c*. Since an interval between the transmission timing of pairing signal P3 and the transmission timing of command signal C3 is fixed, the transmission timing of pairing signal P3 is delayed according to the delay of the transmission timing of command signal C3.

In the interlock communication, third transport vehicle-side communication device 11*c* repeats, in predetermined cycle T2, a series of operations, that is, transmitting command signal C3 (S303) and, after predetermined time period T1, receiving response signal R3 from third port-side communication device 3*c* (S304). Therefore, the transmission timing of a signal related to the interlock communication by second transport vehicle 1*b* and the transmission timing of a signal related to the interlock communication by third transport vehicle 1*c* are basically different from each other by delay time period T3, and wireless communication interference is unlikely to occur.

When predetermined cycle T2 of transport vehicle 1 and predetermined cycle T2 of another transport vehicle 1 that is a target or preferential target are different from each other, wireless communication interference may occur at some point in the predetermined cycles T2 in the interlock communication. However, even if wireless communication interference occurs once at some point in the predetermined cycles T2 in the interlock communication, it does not mean that wireless communication interference occurs in successive points in the predetermined cycles T2 and there is no trouble in the interlock communication as a whole.

4. Advantages

Figure 12:
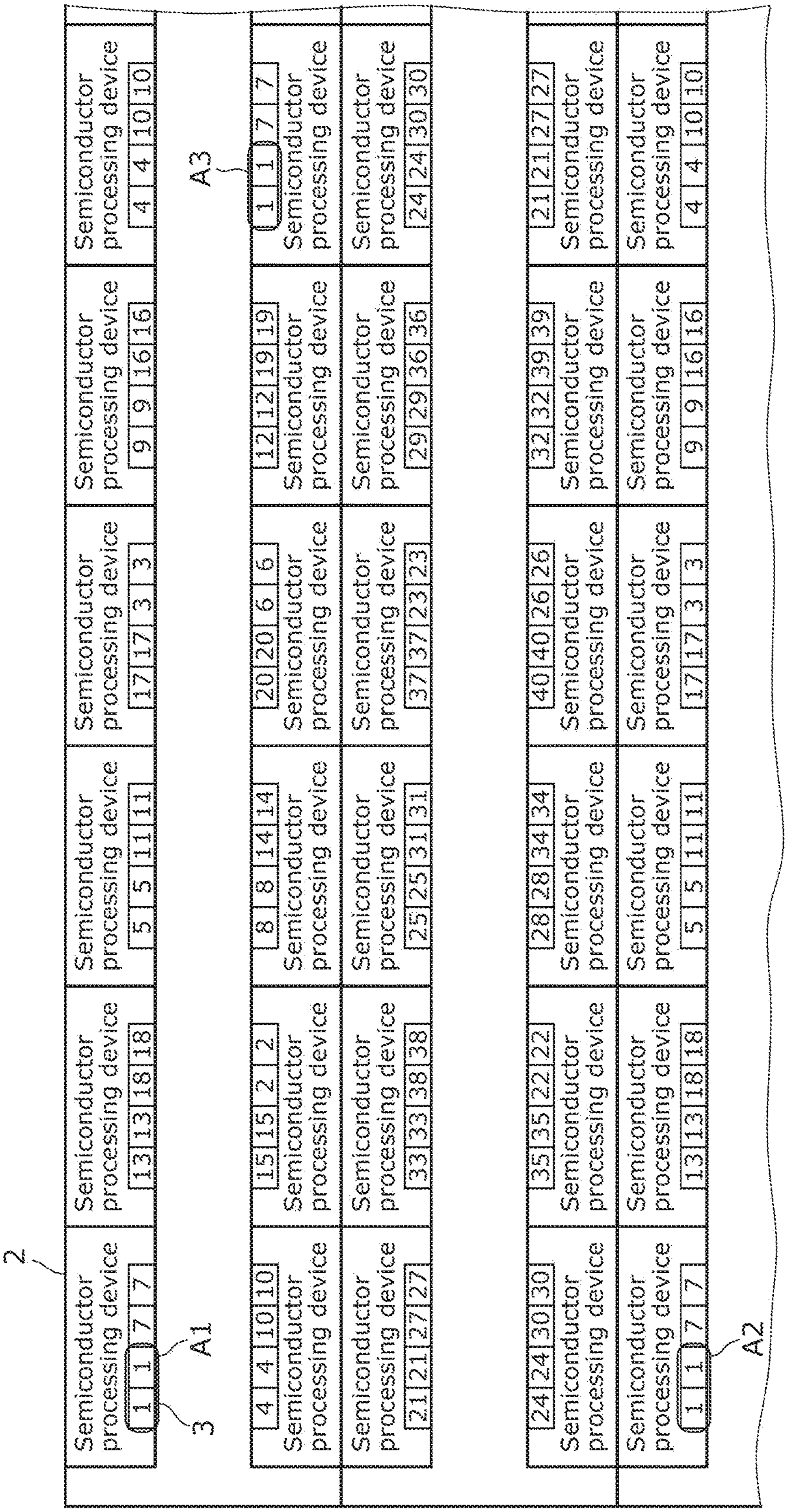
FIG. 12 is a diagram for describing advantages of the wireless communication system according to the example.

Hereinafter, advantages of wireless communication system 10 (particularly, transport vehicle-side communication device 11) according to the example are described with reference to FIG. 12. FIG. 12 is a diagram for describing advantages of the wireless communication system according to the example. In the example illustrated in FIG. 12, a plurality of semiconductor processing devices 2 are provided in a semiconductor manufacturing plant, and each semiconductor processing device 2 includes four port-side communication devices 3 (i.e., each semiconductor processing device 2 includes four ports 4 (not illustrated)). The number shown inside a rectangle representing communication device 3 represents a wireless channel used by the communication device 3. In the example illustrated in FIG. 12, a plurality of port-side communication devices 3 that use the same wireless channel are spaced apart from one another by at least a predetermined distance. Specifically, areas A1, A2, and A3 in each of which port-side communication device 3 that uses wireless channel "1" is disposed are spaced apart from one another by at least a predetermined distance to prevent wireless communication interference. Hereinafter, the distance between area A1 and area A3 is referred to as "first predetermined distance" and the distance between area A1 and area A2 is referred to as "second predetermined distance".

In FIG. 12, there is an area such as area A1, in which two port-side communication devices 3 that use the same wireless channel are arranged adjacent to each other. This is because the two port-side communication devices 3 adjacent to each other do not perform wireless communication at the same time and wireless communication interference does not occur.

For example, it is assumed that transport vehicle 1 (not illustrated) is disposed above one of the two port-side communication devices 3 adjacent to each other. In this example, there is no space for disposing another transport vehicle 1 above the other of the two port-side communication devices 3 adjacent to each other because of the size of transport vehicle 1 above the one of the two port-side communication devices 3 adjacent to each other. In other words, two transport vehicles 1 are never arranged side by side above the two port-side communication devices 3 adjacent to each other. Therefore, one of the two port-side communication devices 3 adjacent to each other cannot perform wireless communication when the other of the two port-side communication devices 3 adjacent to each other is performing wireless communication, and thus the two port-side communication devices 3 adjacent to each other never perform wireless communication at the same time.

When a plurality of port-side communication devices 3 are spaced apart from one another by about the first predetermined distance, wireless communication interference can be prevented. However, there are configurations where it is difficult to space all port-side communication devices 3 apart from one another by about the first predetermined distance, due to the size or the like of a space in which port-side communication devices 3 can be placed in the semiconductor manufacturing plant. For example, in the example illustrated in FIG. 12, there are configurations where a plurality of port-side communication devices 3 can be spaced apart from one another by only about the second predetermined distance (<first predetermined distance) and wireless communication interference may occur. Although it is conceivable to solve the above-described problem by increasing the number of wireless channels to be used, there is still another problem that the number of wireless channels to be used is limited and wireless communication interference cannot be fully prevented.

Then, in wireless communication system 10 according to the example, transport vehicle-side communication device 11 determines whether another transport vehicle 1 is performing an interlock communication using a channel that is to be used for wireless communication between own transport vehicle-side communication device 11 and port-side communication device 3. When transport vehicle-side communication device 11 determines that another transport vehicle 1 is performing an interlock communication using the channel, transport vehicle-side communication device 11 performs control to delay the transmission timing of a signal related to an interlock communication from the transmission timing of a signal related to the interlock communication performed by the other transport vehicle 1.

Therefore, in wireless communication system 10 according to the example, even when a plurality of transport vehicles 1 (i.e., a plurality of port-side communication devices 3) performing interlock communications using the same channel are present relatively close to one another, wireless communication interference is unlikely to occur since the transmission timings of signals related to the interlock communications are different from one another. Accordingly, in wireless communication system 10 according to the example, it is possible to reduce communication error in an interlock communication between transport vehicle 1 (i.e., transport vehicle-side communication device 11) and port-side communication device 3.

In other words, in wireless communication system 10 according to the example, since there is no need to space a plurality of port-side communication devices 3 apart from one another by the first predetermined distance or more, a space in the semiconductor manufacturing plant can be efficiently used even when the number of port-side communication devices 3 is increased. Moreover, in wireless communication system 10 according to the example, since there is no need to increase the number of channels, the number of channels to be used can be controlled and the channels can be efficiently used.

Furthermore, in wireless communication system 10 according to the example, when transport vehicle-side communication device 11 determines that another transport vehicle 1 is performing an interlock communication using a channel that is to be used for wireless communication between own transport vehicle-side communication device 11 and port-side communication device 3, transport vehicle-side communication device 11 also performs control to delay the transmission timing of a pairing signal from the transmission timing of a signal related to the interlock communication performed by the other transport vehicle 1. Accordingly, in wireless communication system 10 according to the example, even when a plurality of transport vehicles 1 performing interlock communications using the same channel are present relatively close to one another, wireless communication interference is unlikely to occur since the transmission timings of pairing signals are different from one another. Consequently, a pairing between transport vehicle-side communication device 11 and port-side communication device 3 is unlikely to fail.

Moreover, in wireless communication system 10 according to the example, when transport vehicle-side communication device 11 determines that there are a plurality of other transport vehicles 1 performing interlock communications using a channel that is to be used for wireless communication between own transport vehicle-side communication device 11 and port-side communication device 3, transport vehicle-side communication device 11 determines a preferential target based on the signal strengths detected by detector 113. Therefore, in wireless communication system 10 according to the example, since a preferential target is determined based on the signal strengths each of which is an indicator indicating likelihood of wireless communication interference, wireless communication interference can be effectively prevented.

Moreover, in wireless communication system 10 according to the example, transport vehicle-side communication device 11 preferentially determines, as a preferential target, another transport vehicle 1 for which a higher signal strength has been detected by detector 113 (determines, as preferential targets, two other transport vehicles 1 for which the highest and second highest signal strengths have been detected). Therefore, in wireless communication system 10 according to the example, since another transport vehicle 1 that has a relatively high possibility of causing wireless communication interference is determined as a preferential target, wireless communication interference can be effectively prevented.

Moreover, in wireless communication system 10 according to the example, when transport vehicle-side communication device 11 determines that there are a plurality of other transport vehicles 1 performing interlock communications using a channel that is to be used for wireless communication between own transport vehicle-side communication device 11 and port-side communication device 3, transport vehicle-side communication device 11 determines a preferential target based on the status of progress of each of the interlock communications performed by the plurality of other transport vehicles 1. Therefore, in wireless communication system 10 according to the example, since a preferential target is determined based on the status of progress of each of the interlock communications that is an indicator indicating the length of time during which wireless communication interference may occur, wireless communication interference can be effectively prevented.

Other Variations

Hereinabove, although a wireless communication system and a communication method have been described based on the above-described example, this disclosure is not limited to the above-described example. Examples resulting from various modifications of the example as well as examples resulting from arbitrary combinations of constituent elements of the example that may be conceived by those skilled in the art are intended to be included within the scope of this disclosure.

In the example, transport vehicle-side communication device 11 may determine, as a preferential target, another transport vehicle 1 for which the highest signal strength has been detected by detector 113. Accordingly, since another transport vehicle 1 that has the highest possibility of causing wireless communication interference is determined as a preferential target, wireless communication interference can be effectively prevented. In this example, transport vehicle-side communication device 11 does not necessarily determine a preferential target based on status of progress of an interlock communication.

Moreover, in the example, transport vehicle-side communication device 11 may determine, as a preferential target, another transport vehicle 1 for which a signal strength having a predetermined threshold value or more has been detected by detector 113. Accordingly, since a preferential target is determined by focusing on another transport vehicle 1 that is likely to cause wireless communication interference, wireless communication interference can be effectively prevented.

In the example, transport vehicle-side communication device 11 may determine, as a preferential target, another transport vehicle 1 of which status of progress of an interlock communication is an execution stage of the pre-transfer procedure. Moreover, in the example, transport vehicle-side communication device 11 may determine, as preferential targets, another transport vehicle 1 of which status of progress of an interlock communication is an execution stage of the pre-transfer procedure and another transport vehicle 1 of which status of progress of an interlock communication is an execution stage of the transfer procedure. Accordingly, since another transport vehicle 1 that takes a relatively long time to complete an interlock communication, that is, another transport vehicle 1 for which a time period during which wireless communication interference may occur is relatively long is determined as a preferential target, wireless communication interference can be effectively prevented.

Moreover, in the example, transport vehicle-side communication device 11 may exclude, from being determined as a preferential target, another transport vehicle 1 of which status of progress of an interlock communication is an execution stage of the post-transfer procedure. Accordingly, since another transport vehicle 1 that takes a relatively short time to complete an interlock communication, that is, another transport vehicle 1 for which a time period during which wireless communication interference may occur is relatively short is excluded from being determined as a preferential target, another transport vehicle 1 that has a relatively high possibility of causing wireless communication interference is likely to be determined as a preferential target and wireless communication interference can be effectively prevented.

In the example, transport vehicle-side communication device 11 is a constituent element of wireless communication system 10; however, this disclosure is not limited to this example. For example, transport vehicle-side communication device 11 can be distributed as a single product in the marketplace. Namely, transport vehicle-side communication device 11 is a communication device that is connected to transport vehicle 1 that travels along track L to transport object 5. Transport vehicle-side communication device 11 includes determiner 111 and processing unit 112. Before a pairing signal is transmitted to port-side communication device 3 connected to port 4 to/from which object 5 is to be transferred by transport vehicle 1, determiner 111 determines whether another transport vehicle 1 is performing an interlock communication using a channel that is to be used for wireless communication between own transport vehicle-side communication device 11 and port-side communication device 3. The pairing signal is a signal that triggers an interlock communication for transferring object 5 to/from port 4 by wireless communication between transport vehicle-side communication device 11 and port-side communication device 3 in a predetermined cycle. When determiner 111 determines that another transport vehicle 1 is performing an interlock communication using a channel that is to be used for wireless communication between own transport vehicle-side communication device 11 and port-side communication device 3, processing unit 112 performs control to delay the transmission timing of a signal related to an interlock communication from the transmission timing of a signal related to the interlock communication performed by the other transport vehicle 1.

In the example, semiconductor processing device 2 includes a single port 4; however, this disclosure is not limited to this example. For example, semiconductor processing device 2 may include a plurality of ports 4. In this example, a plurality of port-side communication devices 3 are connected to the plurality of ports 4 in one-to-one correspondence.

In the example, transport vehicle-side communication device 11 determines a preferential target by referring to a signal strength and status of progress of an interlock communication. However, this disclosure is not limited to this example. For example, transport vehicle-side communication device 11 may determine a preferential target by referring to only a signal strength and may determine a preferential target by referring to only status of progress of an interlock communication. In the latter example, transport vehicle-side communication device 11 does not necessarily include detector 113.

In the example, the number of other transport vehicles 1 that are determined as preferential targets is not limited to one; two or more is acceptable. In this example, delay time period T3 is set so that the transmission timing of a signal from own transport vehicle 1 does not overlap the transmission timings of signals from the two or more other transport vehicles 1 determined as preferential targets. As an example, when there are two other transport vehicles 1 determined as preferential targets, delay time period T3 is set based on the least common multiple of a delay time period regarding one of the two other transport vehicles 1 and a delay time period regarding the other of the two other transport vehicles 1.

In the example, each of constituent elements may be configured as dedicated hardware or may be realized by executing a software program suitable for the constituent element. Each of the constituent elements may be realized by a program executing unit such as a CPU or a processor, loading and executing a software program stored in a storage medium such as a hard disk or a semiconductor memory chip.

Conclusion

As described above, wireless communication system 10 may include: transport vehicle 1 that travels along track L to transport object 5; transport vehicle-side communication device 11 that is connected to transport vehicle 1; and port-side communication device 3 that is connected to port 4 to or from which object 5 is to be transferred by transport vehicle 1, and performs, by wireless communication with transport vehicle-side communication device 11 in a predetermined cycle, an interlock communication for transferring object 5 between port 4 and transport vehicle 1, when port-side communication device 3 receives a pairing signal as a trigger from transport vehicle-side communication device 11. Transport vehicle-side communication device 11 may include: determiner 111 that determines, before the pairing signal is transmitted, whether an other transport vehicle 1 is performing an interlock communication using a channel that is to be used for the wireless communication between transport vehicle-side communication device 11 and port-side communication device 3; and processing unit 112 that performs control to cause a transmission timing of a signal related to the interlock communication to differ from a transmission timing of a signal related to the interlock communication performed by the other transport vehicle 1, when the determiner determines that the other transport vehicle 1 is performing the interlock communication using the channel.

Moreover, when determiner 111 determines that the other transport vehicle 1 is performing the interlock communication using the channel, processing unit 112 in wireless communication system 10 may perform control to cause a transmission timing of the pairing signal to differ from the transmission timing of the signal related to the interlock communication performed by the other transport vehicle 1.

Furthermore, transport vehicle-side communication device 11 in wireless communication system 10 may include detector 113 that detects a signal strength of wireless communication related to the interlock communication performed by the other transport vehicle 1. When determiner 111 determines that a plurality of other transport vehicles 1 each of which is the other transport vehicle 1 are performing interlock communications using the channel, processing unit 112 determines, among the plurality of other transport vehicles 1, a preferential target that is transport vehicle 1 with respect to which the transmission timing of the signal related to the interlock communication is to be caused to differ, based on signal strengths detected by detector 113.

Furthermore, processing unit 112 in wireless communication system 10 may preferentially determine, as the preferential target, transport vehicle 1 for which the signal strength having a higher value has been detected by detector 113, among the plurality of other transport vehicles 1.

Furthermore, processing unit 112 in wireless communication system 10 may determine, as the preferential target, transport vehicle 1 for which the signal strength having a highest value has been detected by detector 113, among the plurality of other transport vehicles 1.

Furthermore, processing unit 112 in wireless communication system 10 may determine, as the preferential target, transport vehicle 1 for which the signal strength having a predetermined threshold value or more has been detected by detector 113, among the plurality of other transport vehicles 1.

Furthermore, when determiner 111 determines that a plurality of other transport vehicles 1 each of which is the other transport vehicle 1 are performing interlock communications using the channel, processing unit 112 in wireless communication system 10 may determine, among the plurality of other transport vehicles 1, a preferential target that is transport vehicle 1 with respect to which the transmission timing of the signal related to the interlock communication is to be caused to differ, based on status of progress of each of the interlock communications performed by the plurality of other transport vehicles 1.

Furthermore, the status of progress of each of the interlock communications performed by the plurality of other transport vehicles 1 in wireless communication system 10 may be an execution stage of any one of a pre-transfer procedure that is executed before object 5 is transferred, a transfer procedure that is executed while object 5 is transferred, or a post-transfer procedure that is executed after the object 5 is transferred. Processing unit 112 preferentially determines, as the preferential target, transport vehicle 1 of which status of progress of the interlock communication is the execution stage of the pre-transfer procedure, among the plurality of other transport vehicles 1.

Furthermore, the status of progress of each of the interlock communications performed by the plurality of other transport vehicles 1 in wireless communication system 10 may be an execution stage of any one of a pre-transfer procedure that is executed before object 5 is transferred, a transfer procedure that is executed while object 5 is transferred, or a post-transfer procedure that is executed after object 5 is transferred. Processing unit 112 preferentially determines, as preferential targets, transport vehicle 1 of which status of progress of the interlock communication is the execution stage of the pre-transfer procedure and transport vehicle 1 of which status of progress of the interlock communication is the execution stage of the transfer procedure, among the plurality of other transport vehicles 1, the preferential targets each being the preferential target.

Furthermore, the status of progress of each of the interlock communications performed by the plurality of other transport vehicles 1 in wireless communication system 10 may be an execution stage of any one of a pre-transfer procedure that is executed before object 5 is transferred, a transfer procedure that is executed while object 5 is transferred, or a post-transfer procedure that is executed after object 5 is transferred. Processing unit 112 excludes, from being determined as the preferential target, transport vehicle 1 of which status of progress of the interlock communication is the execution stage of the post-transfer procedure, among the plurality of other transport vehicles 1.

Furthermore, transport vehicle-side communication device 11 may be a transport vehicle-side communication device that is connected to transport vehicle 1 that travels along track L to transport object 5. The transport vehicle-side communication device 11 includes: determiner 111 that determines whether an other transport vehicle 1 is performing an interlock communication using a channel that is to be used for wireless communication between transport vehicle-side communication device 11 and port-side communication device 3 connected to port 4 to or from which the object is to be transferred by transport vehicle 1, before a pairing signal is transmitted as a trigger for causing port-side communication device 3 to perform, by the wireless communication with transport vehicle-side communication device 11 in a predetermined cycle, an interlock communication for transferring object 5 between port 4 and transport vehicle 1; and processing unit 112 that performs control to cause a transmission timing of a signal related to the interlock communication to differ from a transmission timing of a signal related to the interlock communication performed by the other transport vehicle 1, when determiner 111 determines that the other transport vehicle 1 is performing the interlock communication using the channel.

Furthermore, a communication method may be a communication method of transport vehicle-side communication device 11 that is connected to transport vehicle 1 that travels along track L to transport object 5. The communication method includes: determining whether an other transport vehicle 1 is performing an interlock communication using a channel that is to be used for wireless communication between transport vehicle-side communication device 11 and port-side communication device 3 connected to port 4 to or from which object 5 is to be transferred by transport vehicle 1, before a pairing signal is transmitted as a trigger for causing port-side communication device 3 to perform, by the wireless communication with transport vehicle-side communication device 11 in a predetermined cycle, an interlock communication for transferring object 5 between port 4 and transport vehicle 1; and performing control to cause a transmission timing of a signal related to the interlock communication to differ from a transmission timing of a signal related to the interlock communication performed by the other transport vehicle 1, when the other transport vehicle 1 is determined to be performing the interlock communication using the channel.

INDUSTRIAL APPLICABILITY

Our wireless communication system is applicable to a semiconductor manufacturing system or the like for transporting a FOUP by using a transport vehicle that travels along a track provided to a ceiling, for example.

The invention claimed is:

1. A wireless communication system comprising:

a transport vehicle that travels along a track to transport an object;

a transport vehicle-side communication device that is connected to the transport vehicle; and a port-side communication device that is connected to a port to or from which the object is to be transferred by the transport vehicle, and performs, by wireless communication with the transport vehicle-side communication device in a predetermined cycle, an interlock communication for transferring the object between the port and the transport vehicle, when the port-side communication device receives a pairing signal as a trigger from the transport vehicle-side communication device, wherein the transport vehicle-side communication device includes:

a determiner that determines, before the pairing signal is transmitted, whether an other transport vehicle is performing an interlock communication using a channel that is to be used for the wireless communication between the transport vehicle-side communication device and the port-side communication device; and a processing unit that performs control to cause a transmission timing of a signal related to the interlock communication to differ from a transmission timing of a signal related to the interlock communication performed by the other transport vehicle, when the determiner determines that the other transport vehicle is performing the interlock communication using the channel.

2. The wireless communication system according to claim 1, wherein when the determiner determines that the other transport vehicle is performing the interlock communication using the channel, the processing unit performs control to cause a transmission timing of the pairing signal to differ from the transmission timing of the signal related to the interlock communication performed by the other transport vehicle.

3. The wireless communication system according to claim 1, wherein the transport vehicle-side communication device includes a detector that detects a signal strength of wireless communication related to the interlock communication performed by the other transport vehicle, and when the determiner determines that a plurality of other transport vehicles each of which is the other transport vehicle are performing interlock communications using the channel, the processing unit determines, among the plurality of other transport vehicles, a preferential target that is a transport vehicle with respect to which the transmission timing of the signal related to the interlock communication is to be caused to differ, based on signal strengths detected by the detector.

4. The wireless communication system according to claim 3, wherein the processing unit preferentially determines, as the preferential target, a transport vehicle for which the signal strength having a higher value has been detected by the detector, among the plurality of other transport vehicles.

5. The wireless communication system according to claim 4, wherein the processing unit determines, as the preferential target, a transport vehicle for which the signal strength having a highest value has been detected by the detector, among the plurality of other transport vehicles.

6. The wireless communication system according to claim 3, wherein the processing unit determines, as the preferential target, a transport vehicle for which the signal strength having a predetermined threshold value or more has been detected by the detector, among the plurality of other transport vehicles.

7. The wireless communication system according to claim 1, wherein when the determiner determines that a plurality of other transport vehicles each of which is the other transport vehicle are performing interlock communications using the channel, the processing unit determines, among the plurality of other transport vehicles, a preferential target that is a transport vehicle with respect to which the transmission timing of the signal related to the interlock communication is to be caused to differ, based on status of progress of each of the interlock communications performed by the plurality of other transport vehicles.

8. The wireless communication system according to claim 7, wherein the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit preferentially determines, as the preferential target, a transport vehicle of which status of progress of the interlock communication is the execution stage of the pre-transfer procedure, among the plurality of other transport vehicles.

9. The wireless communication system according to claim 7, wherein the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit preferentially determines, as preferential targets, a transport vehicle of which status of progress of the interlock communication is the execution stage of the pre-transfer procedure and a transport vehicle of which status of progress of the interlock communication is the execution stage of the transfer procedure, among the plurality of other transport vehicles, the preferential targets each being the preferential target.

10. The wireless communication system according to claim 7, wherein the status of progress of each of the interlock communications performed by the plurality of other transport vehicles is an execution stage of any one of a pre-transfer procedure that is executed before the object is transferred, a transfer procedure that is executed while the object is transferred, or a post-transfer procedure that is executed after the object is transferred, and the processing unit excludes, from being determined as the preferential target, a transport vehicle of which status of progress of the interlock communication is the execution stage of the post-transfer procedure, among the plurality of other transport vehicles.

11. A transport vehicle-side communication device that is connected to a transport vehicle that travels along a track to transport an object, the transport vehicle-side communication device comprising:

a determiner that determines whether an other transport vehicle is performing an interlock communication using a channel that is to be used for wireless communication between the transport vehicle-side communication device and a port-side communication device connected to a port to or from which the object is to be transferred by the transport vehicle, before a pairing signal is transmitted as a trigger for causing the port-side communication device to perform, by the wireless communication with the transport vehicle-side communication device in a predetermined cycle, an interlock communication for transferring the object between the port and the transport vehicle; and a processing unit that performs control to cause a transmission timing of a signal related to the interlock communication to differ from a transmission timing of a signal related to the interlock communication performed by the other transport vehicle, when the determiner determines that the other transport vehicle is performing the interlock communication using the channel.

12. A communication method of a transport vehicle-side communication device that is connected to a transport vehicle that travels along a track to transport an object, the communication method comprising:

determining whether an other transport vehicle is performing an interlock communication using a channel that is to be used for wireless communication between the transport vehicle-side communication device and a port-side communication device connected to a port to or from which the object is to be transferred by the transport vehicle, before a pairing signal is transmitted as a trigger for causing the port-side communication device to perform, by the wireless communication with the transport vehicle-side communication device in a predetermined cycle, an interlock communication for transferring the object between the port and the transport vehicle; and performing control to cause a transmission timing of a signal related to the interlock communication to differ from a transmission timing of a signal related to the interlock communication performed by the other transport vehicle, when the other transport vehicle is determined to be performing the interlock communication using the channel.

* * * * *